United States Patent [19]

Motomura

[11] Patent Number: 5,944,811
[45] Date of Patent: Aug. 31, 1999

[54] SUPERSCALAR PROCESSOR WITH PARALLEL ISSUE AND EXECUTION DEVICE HAVING FORWARD MAP OF OPERAND AND INSTRUCTION DEPENDENCIES

[75] Inventor: Masato Motomura, Tokyo, Japan

[73] Assignee: NEC Corporation, Tokyo, Japan

[21] Appl. No.: 08/921,313

[22] Filed: Aug. 29, 1997

[30] Foreign Application Priority Data

Aug. 30, 1996 [JP] Japan .................................. 8-249164

[51] Int. Cl.⁶ ....................................................... G06F 9/30
[52] U.S. Cl. ................................... 712/23; 712/1; 712/5; 712/10; 712/16; 712/214; 712/215
[58] Field of Search ........................ 395/800.23, 800.25, 395/800.26, 800.16; 712/1, 5, 10, 14, 16, 214, 215

[56] References Cited

U.S. PATENT DOCUMENTS

| | | | |
|---|---|---|---|
| 4,594,660 | 6/1986 | Guenthner et al. | 395/800.23 |
| 4,947,316 | 8/1990 | Fisk et al. | 395/285 |
| 5,155,817 | 10/1992 | Kishigami et al. | 395/394 |
| 5,367,650 | 11/1994 | Sharangpani et al. | 395/800.23 |
| 5,442,757 | 8/1995 | McFarland et al. | 395/394 |
| 5,511,172 | 4/1996 | Kimura et al. | 712/23 |
| 5,555,432 | 9/1996 | Hinton et al. | 395/800.23 |

FOREIGN PATENT DOCUMENTS

| | | |
|---|---|---|
| 651321 | 5/1995 | European Pat. Off. . |
| 651331 | 5/1995 | European Pat. Off. . |
| 685789 | 12/1995 | European Pat. Off. . |

OTHER PUBLICATIONS

Mike Johnson, *Superscalar Microprocessor Design*, Prentice Hall, Chapter 3, pp. 31–55, Jan. 1991.

*Primary Examiner*—Meng-Ai T. An
*Assistant Examiner*—Dzung C. Nguyen
*Attorney, Agent, or Firm*—Sughrue, Mion, Zinn, Macpeak & Seas, PLLC

[57] ABSTRACT

In a superscalar processor for fetching a prescribed peak number of instructions in parallel in each period until such instructions are fetched to a predetermined peak number, such as ten, an instruction parallel issue and execution administrating device comprises a forward map buffer for a forward map indicative of a result of each instruction for use as an operand by which one of other instructions of the predetermined peak number. The forward map is developed before the result is actually produced and is used, after the actual production, to indicate which one of such results should be used as the operand by the above-mentiond one of the other instructions.

19 Claims, 25 Drawing Sheets

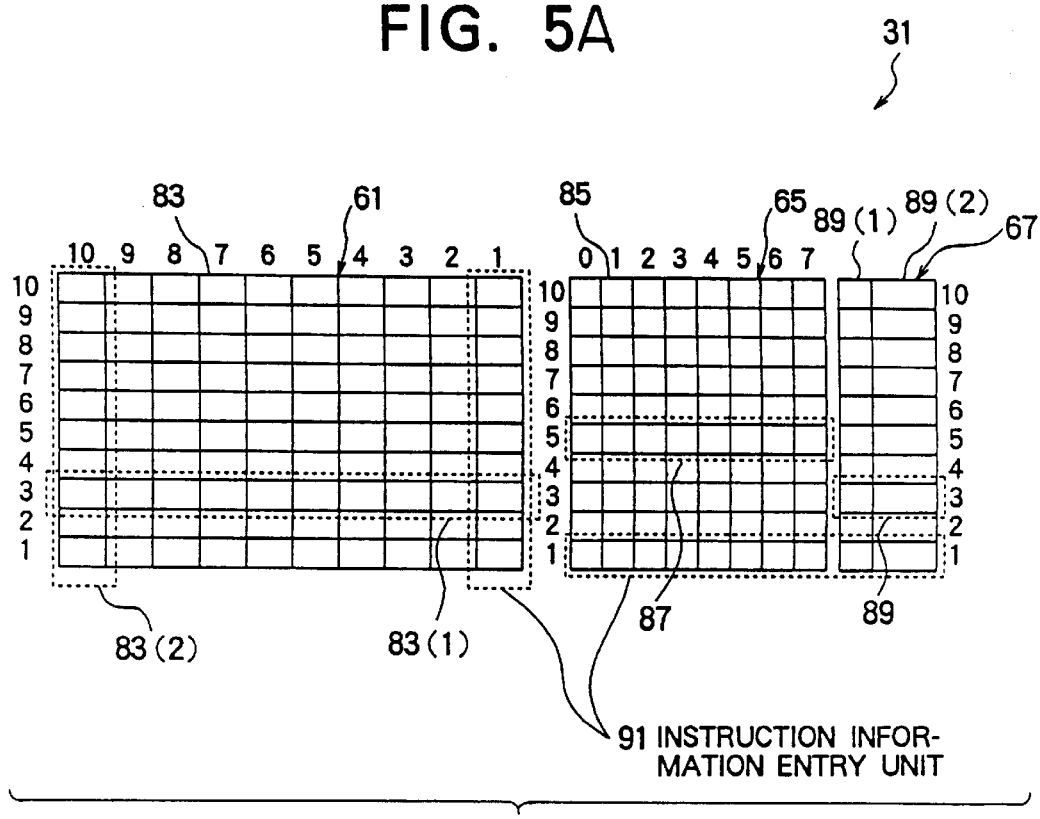
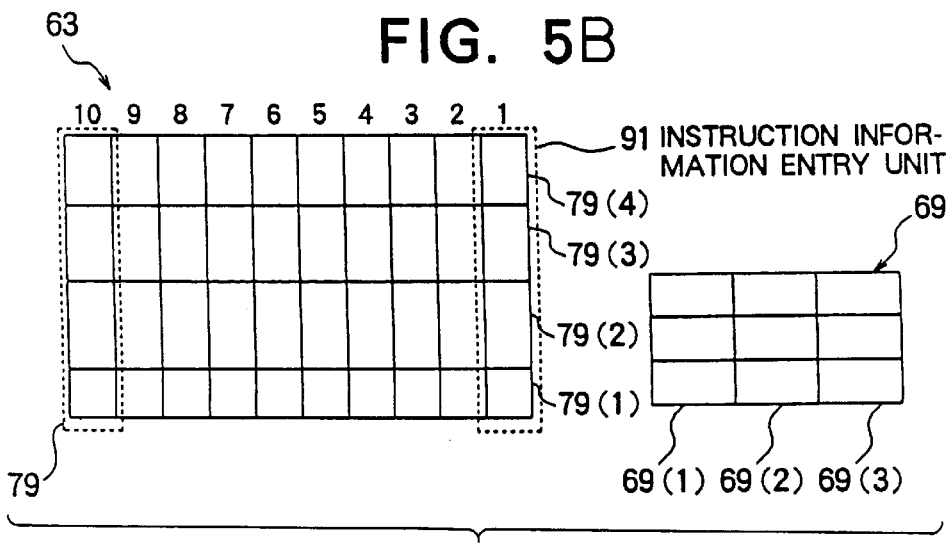

MEMORY ACCESS INSTRUCTION 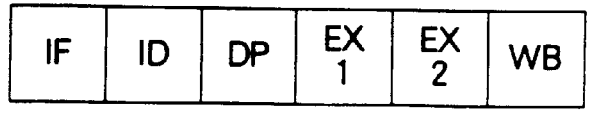
ALU or BRANCH INSTRUCTION 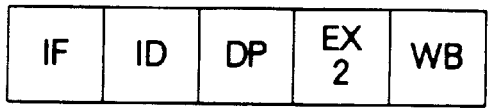
FIG. 6
| | ID | DP | EX 2 | WB |
|---|---|---|---|---|
| FORMER HALF | — | operand fetch | operand forwarding reservation | execution completing |
| LATTER HALF | instruction store | operand store/instruction dispatch | operand bypassing | operand forwarding |
FIG. 7

| IF | ID | DP | EX 2 | WB | |
|----|----|----|------|----|----|
| IF | ID | DP | DP | EX 2 | WB |

FIG. 8A

| IF | ID | DP | EX 2 | WB | |
|----|----|----|------|----|----|
| | IF | ID | DP | EX 2 | WB |

FIG. 8B

| IF | ID | DP | EX 2 | WB |
|----|----|----|------|----|

⋮

| IF | ID | DP | EX 2 | WB |
|----|----|----|------|----|

FIG. 8C

|  |  |  |  |  |  |
|---|---|---|---|---|---|
| (i) | add | r1 | r2 | r3 | ; r1 ← r2 + r3 |
| (ii) | load | r4 | r5 |  | ; r4 ← memory[r5] |
| (iii) | add | r4 | r2 | r4 | ; r4 ← r2 + r4 |
| (iv) | or | r6 | r5 | r3 | ; r6 ← r5 OR r3 |
| (v) | and | r3 | r1 | r6 | ; r3 ← r1 AND r6 |
| (vi) | load | r4 | r4 |  | ; r4 ← memory[r4] |
| (vii) | branch | LL | r4 | r6 | ; Go to LL if (r4 == r6) |
| (viii) | add | r5 | r3 | r6 | ; r5 ← r3 + r6 |
| (ix) LL: | store | r3 | r4 |  | ; memory[r3] ← r4 |

|      |            | t= 0 | 1  | 2  | 3    | 4    | 5    | 6    | 7    | 8    | 9    | 10 |
|------|------------|------|----|----|------|------|------|------|------|------|------|----|
| (i)   | add    r1, r2, r3 | IF | ID | DP | EX2  | WB   |      |      |      |      |      |    |
| (ii)  | load   r4, r5     |    | IF | ID | DP   | EX1  | EX2  | WB   |      |      |      |    |
| (iii) | add    r4, r2, r4 |    |    | IF | ID   | DP   | EX2  | WB   |      |      |      |    |
| (iv)  | or     r6, r5, r3 |    |    |    | IF   | ID   | DP   | EX2  | WB   |      |      |    |
| (v)   | and    r3, r1, r6 |    |    |    |      | IF   | ID   | DP   | EX1  | EX2  | WB   |    |
| (vi)  | load   r4, r4     |    |    |    |      |      | IF   | ID   | DP   | DP   | EX2  | WB |
| (vii) | branch LL, r4, r6 |    |    |    |      |      |      | IF   | ID   | DP   | DP   | DP |
| (viii)| add    r5, r3, r3 |    |    |    |      |      |      |      | IF   | ID   | DP   | DP |
| (ix) LL: | store r3, r4, r4 |    |    |    |      |      |      |      |      | IF   | ID   | DP |

SUPERSCALAR PROCESSOR WITH PARALLEL ISSUE AND EXECUTION DEVICE HAVING FORWARD MAP OF OPERAND AND INSTRUCTION DEPENDENCIES

BACKGROUND OF THE INVENTION

This invention relates to an instruction parallel issue and execution administrating device for use in a processor of a superscalar type in administrating parallel issue and execution of a predetermined number of instructions in parallel.

It is known and widely used on putting a general purpose processor, particularly a microprocessor, at a high performance to use a superscalar technique. In the manner described by Mike Johnson in his book entitled "Superscalar Microprocessor Design" published by Prentice Hall, in particular, Chapter 3, pages 31 to 55, a processor is operable according to the superscalar technique as follows. A predetermined peak number of instructions are concurrently fetched in parallel and decoded into a plurality of decoded instructions. From these decoded instructions, a simultaneously executable number of instructions are dynamically identified as a plurality of identified instructions. The identified instructions are issued in parallel to a plurality of arithmetic-logic and memory access units for parallel execution. In this manner, a superscalar processor deals with parallel processing of the instructions.

A conventional superscalar processor comprises for the parallel processing an instruction parallel issue administrating device and an instruction parallel execution administrating device. In general, the instruction parallel issue administrating device is called a reservation station. The instruction parallel execution administrating device is referred to as a recorder buffer.

In the manner which will later be described in greater detail, the instruction parallel issue and the instruction parallel execution administrating devices are operable as follows. The instruction parallel issue administrating device temporarily stores the decoded instructions as stored instructions, typically eight in number. Tests are carried out whether or not each stored instruction can be issued as an issued instruction. If present, at least one issued instruction is issued. If found impossible to issue as such issued instructions from time to time, a stored instruction is held in the instruction parallel issue administrating device as a preissued instruction. In a next processing cycle, a test is carried out whether or not the preissued instruction can now be issued.

On judging whether or not each stored instruction can be issued, it is tested whether or not all operands are already produced for use by the stored instruction under consideration. It will herein be presumed that such requested or required operands are two in number for each instruction.

The instruction parallel execution administrating device temporarily stores a plurality of preconfirmed results of execution of the issued instructions as stored results, typically sixteen in number. This temporary storage is in order to insure an execution order or sequence in which the issued instructions are actually executed and which may be different from a fetch and decode order of simultaneously fetching and decoding the predetermined peak number of instructions from time to time. The preconfirmed results are so called because such results are produced by the issued instructions, the execution of which is not yet finally confirmed. The stored results are produced for use as the operands of each issued instruction.

In connection with the foregoing, the simultaneously executed number is either equal to or approximately equal to the predetermined peak number and is the number of instructions which are actually executed in parallel to their ends. It will be assumed that the predetermined peak number is equal to three and that the simultaneously executed number is equal also to three. In this event, the instruction parallel issue administrating device must comprise forty-eight comparators. The instruction parallel execution administrating device must comprise 144 comparators.

When each of the predetermined peak number and the simultaneously executed number is equal to nine, the comparators must be included in the instruction parallel issue administrating device as many as 432 and in the instruction parallel execution administrating device as many as 1,296 and thus 1,728 in total. In this manner, the number of comparators increases nearly in proportion to a square of the number of instructions which should be issued, executed, and executed to their ends.

Inasmuch as this great number of comparators must individually be controlled, each of the instruction parallel issue and the instruction parallel execution administrating devices has been complicated in circuit structure. Moreover, each of the devices has had an objectionably great circuit scale. Simultaneous and parallel comparison by these comparators has made it unavoidable to consume a great amount of electric power. On increasing a degree of parallel processing, it has been inevitable to allow a delay in the parallel processing. Although such a conventional superscalar processor has been actually manufactured and practically used for parallel issue and parallel completion of execution of three instructions, it has been difficult to develop a superscalar processor of a highly raised architecture capable of concurrently executing an increased number of instructions in parallel, such as ten instructions.

SUMMARY OF THE INVENTION

It is consequently an object of the present invention to provide an instruction parallel issue and execution administrating device for use in a superscalar processor in place of a conventional combination of an instruction parallel issue and an instruction parallel execution administrating device.

It is another object of this invention to provide an instruction parallel issue and execution administrating device which is of the type described and which does not comprise comparators.

It is still another object of this invention to provide an instruction parallel issue and execution administrating device which is of the type described and which has a simple circuit structure of a reduced circuit scale.

It is yet another object of this invention to provide an instruction parallel issue and execution administrating device which is of the type described and which is operable with a low power consumption.

It is a further object of this invention to provide an instruction parallel issue and execution administrating device which is of the type described and which is operable with a short delay even when up to about ten instructions are subjected to parallel processing.

It is a still further object of this invention to provide an instruction parallel issue and execution administrating device which is of the type described and which can detect a dependency between a result of execution of a preceding instruction in an instruction sequence and an operand requested by a following instruction in the sequence.

It is a yet further object of this invention to provide an instruction parallel issue and execution administrating device which is of the type described and which can forward a result of execution of a forward source instruction to an operand of a forward destination instruction.

Other objects of this invention will become clear as the description proceeds.

In accordance with this invention, there is provided an instruction parallel issue and execution administrating device for use in a superscalar processor in issuing and executing a predetermined peak number of instructions in parallel, comprising a forward map buffer for storing a forward map indicative of use of a result produced by complete execution of each of the instructions as an operand by which of others of the instructions, the forward map being stored preliminarily before actual production of the result and used in identifying, when the result is produced by the complete execution, one of the others of the instructions that uses as the operand the result indicated by the forward map.

BRIEF DESCRIPTION OF THE DRAWING

FIG. 5 shows in blocks, principal circuit parts of the instruction parallel issue and execution administrating device illustrated in FIG. 4;

FIG. 6 shows an example of pipeline timings of operation of the microprocessor depicted in FIG. 1;

FIG. 7 shows a time schedule of operation of the instruction parallel issue and execution administrating device depicted in FIGS. 4 and 5 in accordance with the pipeline timings illustrated in FIG. 6;

FIGS. 8A, 8B, and 8C show three examples of the pipeline timings of the instruction parallel issue and execution administrating device of FIGS. 4 and 5 in connection with the instructions which have a data dependency;

FIG. 9 exemplifies an instruction sequence processed by the instruction parallel issue and execution administrating device depicted in FIGS. 4 and 5 and operation stages indicated by respective instructions of the sequence;

FIG. 10 shows, together with a plurality of pipeline cycle numbers, the instruction sequence illustrated in FIG. 9 and the pipeline timings which are for the instruction sequence and are similar to those depicted in FIG. 8;

FIGS. 11 to 20 show, in detail, operations of the instructions carried out by the instruction parallel issue and execution administrating device depicted in FIG. 5 at various pipeline cycle numbers indicated in FIG. 10;

DESCRIPTION OF THE PREFERRED EMBODIMENT

Figure 1:
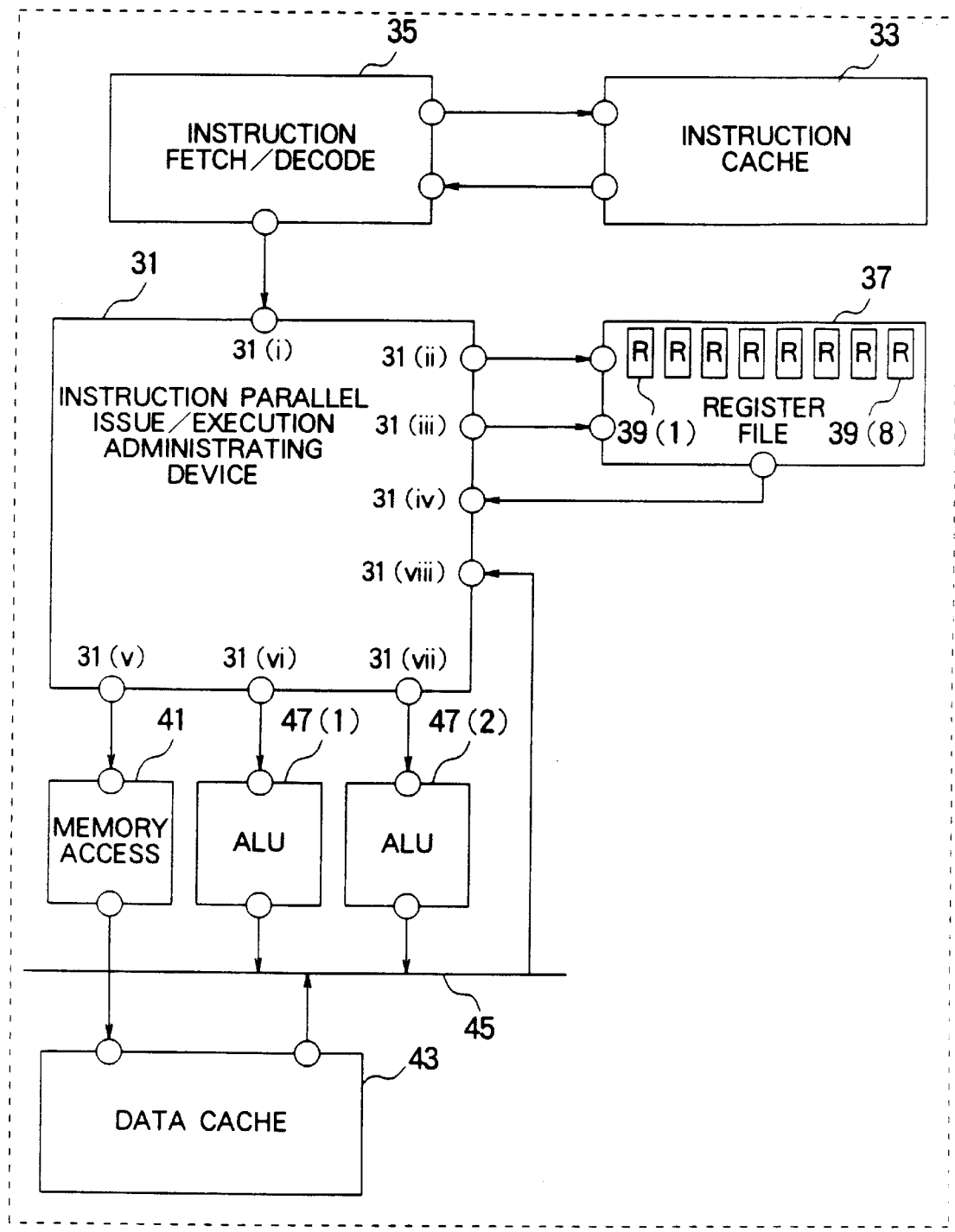
FIG. 1 is a block diagram of a processor which comprises an instruction parallel issue and execution administrating device according to the instant invention.

Referring to FIG. 1, an instruction parallel issue and execution administrating device 31 is used in a processor which is enclosed with a dashed-line rectangle and may be a general purpose processor or microprocessor for dealing with a plurality of instructions, such as three instructions, concurrently in parallel. The instruction parallel issue and execution administrating device 31 has an instruction code (or decoded instruction) input terminal 31(i), a register file read control terminal 31(ii), a register file write terminal 31(iii), a register file read data terminal 31(iv), an access instruction issue terminal 31(v), first and second instruction issue terminals 31(vi) and 31(vii), and a result input terminal 31(viii) and has conventionally been composed of an instruction parallel issue administrating device and an instruction parallel execution administrating device which will presently be described.

The processor comprises an instruction cache 33 in which a relatively small number of instructions are stored at a time from an external memory (not shown) in the manner known in the art. Connected to the instruction cache 33, an instruction fetch and decode unit 35 fetches and decodes a plurality of instructions into instruction codes to deliver the instruction codes to the instruction code input terminal 31(i). When the processor is for three instructions in parallel, the instruction fetch and decode unit 35 should be able to decode up to three instructions in parallel at a time. Delivered through the instruction code input terminal 31(i), the instruction codes are temporarily stored in the instruction parallel issue and execution administrating device 31. It is possible to make the instruction fetch and decode unit 35 fetch such a plurality of instructions in parallel directly from the external memory without using the instruction cache 33.

Connected to the register file read control terminal 31(ii) and to the register file write terminal 31(iii), a register file 37 comprises a plurality of registers (R) 39, such as first to eighth registers 39(1), 39(2), . . . , and 39(8). It will be presumed that an instruction may specify up to two of the registers 39 at a time. In response, such two registers simultaneously supply the read data terminal 31(iv) with two input operands as first and second operands.

Connected to the access instruction issue terminal 31(v) is a memory access unit 41 which is in turn connected to a data cache 43. Stored in the instruction parallel issue and execution administrating unit 31, an instruction code may indicate load or store of a datum in or from an address of the data cache 43. Responsive to such an access instruction, the memory access unit 41 specifies the address to make the data cache 43 deliver, when the instruction code indicates load, the datum as a result to a result bus 45 which is connected to the data cache 43 and to the result input terminal 31(viii).

The instruction code may indicate an arithmetic logic operation of the processor, specifying the first and the second operands. Delivered to the first and the second instruction issue terminals 31(vi) and 31(vii), first and second instruction codes may specify different arithmetic logic operations on two different operand sets, respectively. At any rate, first and second arithmetic-logic or arithmetic units (ALU) 47(1) and 47(2) are connected to the first and the second instruction issue terminals 31(vi) and 31(vii) to carry out such arithmetic logic operations on the operand sets to deliver respective results to the result bus 45. One of the operand sets may consist of only one operand.

The processor my comprise optionally predetermined numbers of the memory access unit 41 and of the arithmetic unit, which will be designated by a single reference numeral 47 omitting the suffixes (1) and (2), so as to deal with the three instructions in parallel. The instruction code may specify up to two of the registers 39 where the results delivered to the result input terminal 31(viii) and indicated by such an instruction code should be stored. The memory access unit 41 and the result bus 45 may be connected directly to the external memory rather than to the data cache 43 as is the case with the instruction cache 43. It may be mentioned here that an expression "preissue instruction" refers to an instruction which is stored in the instruction parallel issue and execution administrating device 31 together with all operands therefor and is not yet issued to the instruction issue terminals 31(v) to 31(vii) and that the instruction code may be a branch instruction indicative of a branch.

Figure 2:
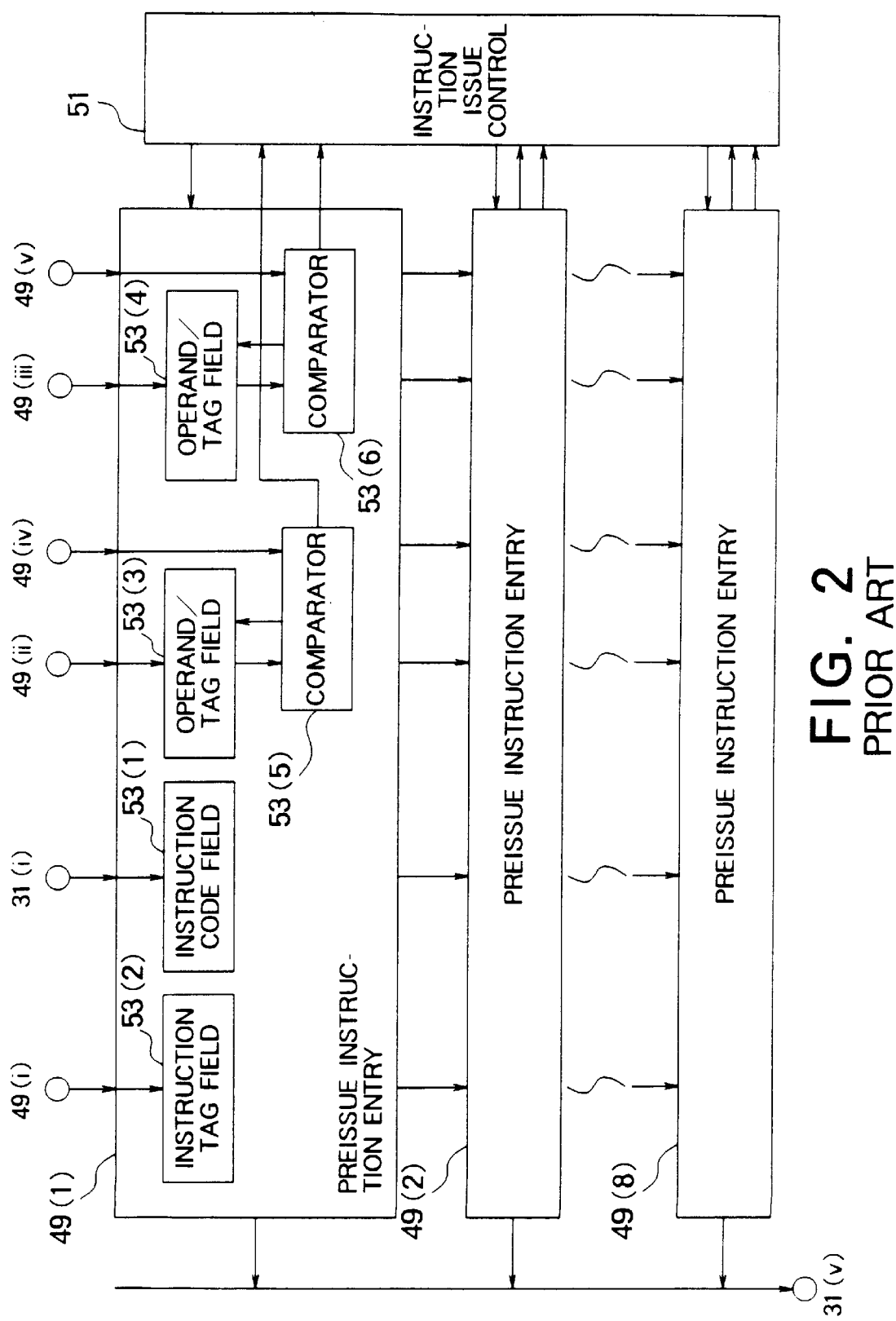
FIG. 2 is a block diagram of a conventional instruction parallel issue administrating device.

Turning to FIG. 2 with FIG. 1 continuously referred to, a conventional instruction parallel issue administrating device comprises a plurality of cascaded preissue instruction entries 49, such as first to eighth preissue instruction entries 49(1), 49(2), . . . , and 49(8), controlled in common by an instruction issue control unit 51 to issue instructions to the instruction issue terminals depicted at 31(v). The first preissue instruction entry 49(1) has the instruction code input terminal 31(i). Each preissue instruction entry 49 is for temporarily storing one preissue instruction at a time as will shortly become clear and comprises, in the manner depicted in the first preissue instruction entry 49(1), an instruction code field 53(1) for the instruction code supplied through the instruction code input terminal 31(i), and an instruction tag field 53(2) connected to an instruction tag input terminal 49(i), a first operand/tag field 53(3) connected to a first operand/tag input terminal 49(ii), a second operand/tag field 53(4) connected to a second operand/tag input terminal 49(iii), a first preissue comparator 53(5) connected to the first operand/tag field 53(3) and to a first tag input terminal 49(iv) to deliver a first result of comparison to the instruction issue control unit 51, and a second preissue comparator 53(6) connected to the second operand/tag field 53(4) and to a second tag input terminal 49(v) to deliver a second result of comparison to the instruction issue control unit 51.

In order to actually issue an instruction, it is necessary to check whether or not all operands therefor are already in store. The instruction tag field 53(2) stores an instruction tag specific to an instruction code stored in the instruction code field. When the first operand is already available, the first operand is stored in the first operand/tag field 53(3). When the first operand is not yet available, that instruction tag is stored in the first operand/tag field 53(3) which will make either the register file 37 or the data cache 43 produce the first operand as the result. This applies to the second operand/tag field 53(4).

It should be noted in connection with the following that the first or the second operand is not identical with the instruction tag of the first or the second instruction code. When the first and the second instruction codes are completely executed, their instruction tags are supplied through the first and the second tag input terminals 49(iv) and 49(v) to the comparators 45(5) and 45(6) of all preissue instruction entries 49. If the results of comparison indicate coincidence, the results of execution of the instructions are stored through the operand/tag input terminals 49(ii) and 49(iii) in the first and the second operand/tag fields 53(3) and 53(4). Responsive to the results of comparison, the instruction issue control unit 51 judges whether or not all operands are already in store for the first and the second instructions.

Figure 3:
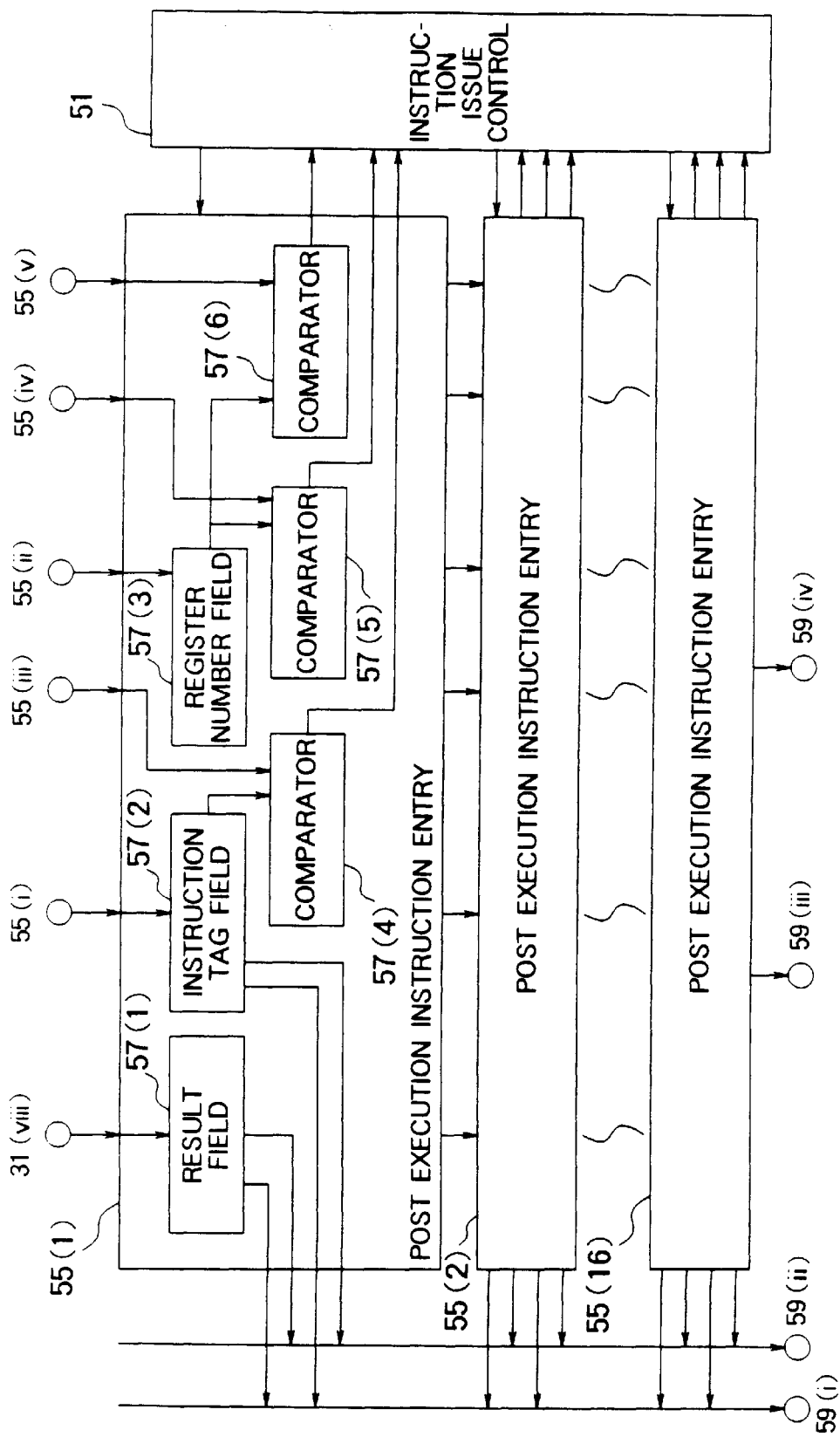
FIG. 3 is a block diagram of a conventional instruction parallel execution administrating device.

Further turning to FIG. 3 with FIG. 1 continuously referred to, a conventional instruction parallel execution administrating device comprises a plurality of cascaded post execution instruction entries 55, such as first to sixteenth post execution instruction entries 55(1), 55(2), . . . , and 55(16), controlled in common by an instruction issue control unit which is similar to that described in conjunction with FIG. 2 and is therefore designated by the reference numeral 51. It should be noted in connection with the processor of FIG. 1 that the instruction may be executed to an end in an execution order which is different from a fetch order of fetching from the instruction cache 33. The instruction parallel execution administrating device is for insuring the execution order by temporarily storing each result of execution of an instruction as a preconfirmed result when the result of execution is not yet finally confirmed. More particularly, each of the post execution instruction entries 55 is for one preconfirmed result of an instruction which is actually executed. After finally confirmed, such results of execution are produced as the first and the second operands.

The first post execution instruction entry 55(1) has the result input terminal 31(viii). As depicted in the first post execution instruction entry 55(1), each post execution instruction entry comprises a result field 57(1) for storing the result produced by the data cache 43 and supplied through the result input terminal 31(viii), an instruction tag field 57(2) connected to an instruction tag storage input terminal 55(i), a register number field 57(3) connected to a register number storage input terminal 55(ii), a tag comparator 57(4) connected to the instruction tag field 57(2) and to an instruction tag comparison input terminal 55(iii) to deliver a result of tag comparison to the instruction issue control unit 51, a first comparator 57(5) connected to the register number field 57(3) and to a first register number comparison input terminal 55(iv) to deliver a first result of comparison to the instruction issue control unit 51, and a second comparator 57(6) connected to the register number field 57(3) and to a second register number comparison input terminal 55(v) to deliver a second result of comparison to the instruction issue control unit 51.

The result fields 57(1) of the post executed instruction entries 55 are connected to first and second operand/tag output terminals 59(i) and 59(ii). The instruction tag fields 57(2) of the post execution instruction entries 55 are connected also to the first and the second operand/tag output terminals 59(i) and 59(ii). The sixteenth post execution instruction entry 55(16) has a result output terminal 59(iii) and a register number output terminal 59(iv). The first and the second operand/tag output terminals 59(i) and 59(ii) and the result output terminal 59(iii) correspond to one of the first and the second instruction issue terminals 31(vi) and 31(vii). The register number output terminal 59(iv) corresponds to the register file read control terminal 31(iii).

It would have been understood from the foregoing that an arithmetic logic instruction may make the register file 37 produce at least one operand. This operand may, however, not be stored in one of the registers 39 that has a register number specified by the arithmetic logic instruction. In such an event, the instruction parallel execution administrating device checks whether or not the operand in question is temporarily stored as the preconfirmed result therein. If stored, the preconfirmed result is produced as the operand. Such check and production are processed by parallel comparison operations of the first and the second comparators 57(5) and 57(6) as follows.

In each of the post execution instruction entries 55, the preconfirmed result is stored in the result field 57(1). The instruction tag of the arithmetic logic instruction is stored in the instruction tag field 57(2). The register number is stored in the register number field 57(3) in connection with one of the registers 39 in which the datum should be stored as the operand. When the arithmetic logic instruction requests two operands, first and second register numbers are supplied through the first and the second register number comparison input terminals 55(iv) and 55(v) to the first and the second comparators 57(5) and 57(6) of all post execution instruction entries 55.

In FIG. 3, the instruction issue control unit 51 checks whether or not the comparison results of the first and the second comparators 57(5) and 57(6) of each of the post execution instruction entries 55 indicate coincidence between the register number stored in the register number field 57(3) and the register numbers supplied through the first and the second register number comparison input terminals 55(iv) and 55(v), respectively. If the coincidence is found more than one time for a single operand, the instruction issue control unit 51 decides that the coincidence is present in one of the post execution instruction entries 55 that is most recently supplied with the register number through the register number storage input terminal 57(ii). The instruction issue control unit 51 thereby makes the result field 57(1) and the instruction tag field 57(2) of this one of the post execution instruction entries deliver the result and the instruction tag stored therein to the first and the second operand/tag output terminals 59(i) and 59(ii), respectively.

In each post execution instruction entry, the tag comparator 57(4) is used in transferring the preconfirmed result of the post execution instruction entry under consideration to which one of the post execution instruction entries 55. More particularly, the instruction issue control unit 51 compares in parallel the comparison results in the post execution instruction entries 55, each comparison result between the instruction tag stored in the instruction tag field 57(2) and the instruction tag supplied through the instruction tag comparison input terminal 55(iii). The instruction issue control unit 51 thereby decides, as this latter one of the post execution instruction entries 55, one that shows the coincidence by its tag comparator 57(4). In addition, the instruction issue control unit 51 makes the result field 57(1) and the register number field 57(3) of this latter one of the post execution instruction entries 55 produce, after confirmation of execution of an instruction, the result of execution of this instruction and the register number to the result and the register number output terminals 59(iii) and 59(iv) for storage in the register file 37 of FIG. 1.

Reviewing FIGS. 1 to 3 and more specifically to FIGS. 2 and 3, the instruction parallel issue administrating device comprises in the preissue instruction entries 49 the first and the second preissue comparators 53(5) and 53(6) which are used in parallel comparison operations on judging whether or not an instruction can be issued. Similarly, the instruction parallel execution administrating device comprises in the post execution instruction entries 55 the first and the second comparators 57(5) and 57(6) which are used in parallel operation on judging which of the post execution instruction entries 55 should be given a preconfirmed result as an operand. In practice, the number of the preissue comparators, such as 53(5) and 53(6), should be equal in each of the preissue instruction entries 49 to the number of instructions which should be executed in parallel. The number of the tag comparator 57(4) in each of the post execution instruction entries 55 should be equal to the number of instructions which are simultaneously completely having executed. The number of the first and the second or like comparators, such as 57(5) and 57(6) should be equal in each post execution instruction entry to the number of instructions which are concurrently decoded in parallel.

In the manner described above, a conventional combination of the instruction parallel issue and the instruction parallel execution administrating devices must comprise a great number of comparators in decoding, issuing, and executing a predetermined number of instructions in parallel. It will be assumed as described before that the predetermined number is equal to three. Although considerably complicated to design, a superscalar microprocessor for issuing and completely executing three instructions in parallel has actually been manufactured and used. As exemplified, the instruction parallel issue administrating device comprises eight preissue instruction entries 49. The instruction parallel execution administrating device comprises sixteen post execution instruction entries 55. The number of comparators therefore amounts to a sum of 2×3×8 or 48 plus 3×3×16 or 144, namely, to 192.

When the superscalar microprocessor should issue and completely execute nine instructions in parallel, the numbers of preissue instruction entries and of post execution instruction entries should be equal, for example, to twenty-four and forty-eight, respectively. In this case, the number of comparators amounts to a sum of 2×9×24 or 432 plus 3×9×48 or 1,296, namely, to 1,728. In this manner, the number of comparators increases approximately in proportion to a square of the number of instruction which should be issued and completely executed in parallel.

Figure 4:
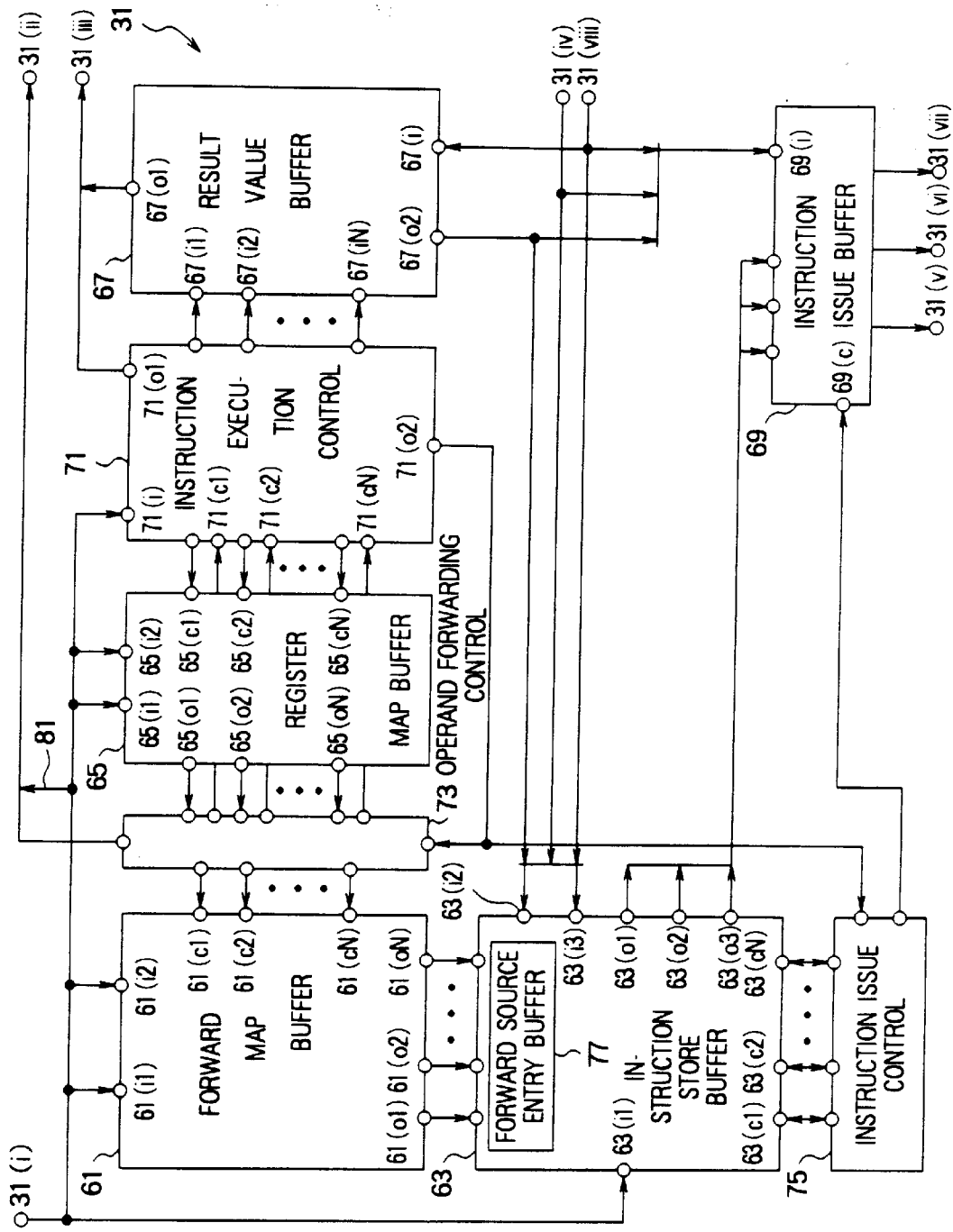
FIG. 4 is a block diagram of the instruction parallel issue and execution administrating device mentioned in conjunction with FIG. 1.

Referring now to FIG. 4 and continuously to FIG. 1, the instruction parallel issue and execution administrating device 31 comprises a forward map buffer 61 having a forward map store terminal 61(i1) and a forward map renewal control terminal 61(i2) connected to the instruction code input terminal 31(i), first to N-th forward map output terminals 61(o1), 61(o2), . . . , and 61(oN), and first to N-th forward map control terminals 61(c1), 61(c2), . . . , and 61(cN), where N represents a total number of preissued, in execution, and preconfirmed instructions as a predetermined peak number and may be equal to ten. An instruction store buffer 63 has an instruction input terminal 63(i1) connected to the instruction code input terminal 31(i), laevooperand and dextrooperand input terminals 63(i2) and 63(i3), both connected to one of the register file read data terminal 31(iv) and and the result input terminal 31(viii) at a time, code, laevooperand, and dextrooperand output terminals 63(o1), 63(o2), and 63(o3), and first to N-th instruction buffer control terminals 63(c1), 63(c2), . . . , and 63(cN) connected to the instruction issue control unit 75. A register map buffer 65 has read and write register indication terminals 65(i1) and 65(i2) connected to the instruction code input terminal 31(i), first to N-th register write detection terminals 65(o1), 65(o2), . . . , and 65(oN), and first to N-th register map control terminals 65(c1), 65(c2), . . . , and 65(cN). A result value buffer 67 has first to N-th result buffer input terminals 67(i1), 67(i2), . . . , and 67(iN), a result value input terminal 67(i) connected to the result input terminal 31(viii), a first result buffer output terminal 67(*o*1) connected to the register file write terminal 31(iii), and a second result buffer output terminal 67(*o*2) connected to the laevooperand and the dextrooperand input terminals 63(*i*2) and 63(*i*3).

In the instruction parallel issue and execution administrating device depicted in FIG. 4, an instruction issue buffer 69 has an instruction input terminal 69(*i*) connected selectively to the register read data terminal 31(iv), the result input terminal 31(viii), and the second buffer output terminal 67(*o*2), an instruction issue control terminal 69(*c*), first to third instruction buffer input terminals connected to the code, the laevooperand, and the dextrooperand output terminals 63(*o*1) to 63(*o*3), respectively, and the access and the first and the second instruction issue terminals 31(v), 31(vi), and 31(vii). An instruction execution control unit 71 has an instruction execution input terminal 71(*i*) connected to the instruction code input terminal 31(i), first to N-th primary (left) control terminals controlling the first to the N-th register map control terminals 65(*c*1) to 65(*c*N), respectively, first to N-th secondary (right) control terminals connected to the first to the N-th result buffer input terminals 67(*i*1) to 67(*i*N), respectively, first to N-th instruction execution control terminals 71(*c*1), 71(*c*2), . . . , and 71(*c*N), a first instruction execution output terminal 71(*o*1) connected to the register file write terminal 31(iii), and a second instruction execution output terminal 71(*o*2). An operand forwarding control unit 73 has first to N-th register write detection terminals connected to the first to the N-th register write detection terminals 65(*o*1) to 65(*o*N), respectively, first to N-th forward map renewal terminals connected to the first to the N-th forward map control terminals 61(*c*1) to 61(*c*N), respectively, first to N-th preconfirmed result read request terminals connected to the first to the N-th instruction execution control terminals 71(*c*1) to 71(*c*N) (with intermediate portions hidden behind the register map buffer 65), respectively, a forward source indication terminal connected to the second instruction execution output terminal 71(*o*2), and a register read request terminal connected to the register file read control terminal 31(ii).

Furthermore in the instruction parallel issue and execution administrating device 31, an instruction issue control unit 75 corresponds to the instruction issue control unit 51 described in conjunction with FIGS. 2 and 3 and has first to N-th instruction issue control terminals connected to the first to the N-th instruction buffer control terminals 63(*c*1) to 63(*c*N), respectively, a control input terminal connected to the second instruction execution output terminal 71(*o*2), and a control output terminal connected to the instruction issue control terminal 69(*c*). The instruction store buffer 63 comprises a forward source entry buffer 77 connected to the first to the N-th forward map control terminals 61(*c*1) to 61(*c*N) and depicted nearer to the forward map output terminals 61(*o*1) to 61(*o*N) rather than to the first to the N-th forward map control terminals 61(*c*1) to 61(*c*N) merely for convenience of illustration. In the manner which will presently be described, the forward map buffer 61 comprises first to N-th forward source entry units. As described before, the instruction parallel issue and execution administration device 31 concurrently deals with three instructions in parallel at a time. The forward source entry buffer 77 is for temporarily storing, at a time for use in operand forwarding, six (twice the number of instructions concurrently dealt with) forward map information inputs of six of forward source entry units.

Reviewing FIG. 1, it may be mentioned here before further proceeding with the description that an instruction specifies only one of the registers 39 at a time for storage of the result delivered to the result bus 47. A data dependency as regards the register file 37 is said to exist between two results which are produced earlier and later in response to the three instructions processed simultaneously in parallel and which should be stored in one of the registers 39 specified by these instructions. More in general, such a data dependency is said present between a result of an earlier issued instruction and an operand of a later issued instruction if a common one of the registers 39 is used by the result and the operand.

Like the instruction parallel issue and execution administrating devices illustrated with reference to FIGS. 2 and 3, the instruction parallel issue and execution administrating device 31 stores up to three preissue instructions at a time and temporarily stores instructions which are issued and are in or under execution and will be called in execution instructions. Moreover, the instruction parallel issue and execution administrating device 31 temporarily stores instructions which are already executed and have their results not yet confirmed and will be called preconfirmed instructions. In other words, the instruction parallel issue and execution administrating device 31 stores from time to time all instructions which are decoded simultaneously and of which the results are not yet definitely confirmed. The instruction parallel issue and execution administrating device 31 additionally stores for later storage in the registers 39 the results which are supplied through the result bus 47 and are not yet finally confirmed.

It should be noted here that an instruction or a result is said to be confirmed when the instruction is completely executed and furthermore when all previously executed instructions are already executed with none of such instructions and their results not cancelled as a result of interruption, exception, or a failure in branch prediction. When one or both of two operands requested by preconfirmed instructions is or are not yet confirmed, the instruction parallel issue and execution administrating device 31 carries out a forwarding operation of forwarding each preconfirmed result to an operand of a preconfirmed instruction that serves as a source of requesting this operand. In such a case, the preconfirmed result is either the result supplied through the result input terminal 31(viii) or the preconfirmed result temporarily stored in the instruction parallel issue and execution administrating device 31.

Turning to FIG. 5 with FIGS. 1 and 4 additionally referred to, it should be noted that the instruction parallel issue and execution administrating device 31 is depicted with simplification here and there. In the manner depicted in a left bottom area of FIG. 5, the instruction store buffer 63 comprises a plurality of instruction store entry units 79 arranged, as exemplified in dotted-line rectangles, in N columns which are indicated by numbers 1, 2, . . . , and 10 from right to left as first to N-th instruction store entry units. Each of the instruction store entry units 79 comprises an issue flag area 79(1), an instruction code area 79(2), and laevooperand and dextrooperand areas 79(3) and 79(4).

The issue flag area 79(1) will later become clear. The instruction code areas 79(2) of the instruction store entry units 79 are for storing the instruction codes supplied through the instruction code input terminal 31(i) and the instruction input terminal 63(*i*1) up to three at a time. In the manner later be described in greater detail, these three instruction codes are stored at first in the columns numbered 1 to 3. The laevooperand and the dextrooperand areas 79(3) and 79(4) of the instruction store entry units 79 are for storing as laevooperands and dextrooperands the first and the second operands supplied to the laevooperand and the dextrooperand input terminals 63(*i*2) and 63(*i*3). As will later be described in greater detail, the laevooperands and the dextrooperands are stored in correspondence to the instruction codes stored in the instruction code areas 79(2). If only one operand is requested by an instruction, this operand is stored in the laevooperand area 79(3). Incidentally, the instruction code input terminal 31(i) is connected by a connection 81 (FIG. 4) to the register file read control terminal 31(ii). When the instruction store entry units 79, ten in number, are full of the instruction codes and related information, the instruction fetch and decode unit 35 (FIG. 1) temporarily suspends its operation. Operation of the forward source entry buffer 77 (FIG. 4) will later become clear.

In a left top area of FIG. 5, the forward map buffer 61 comprises a plurality of forward bit cells 83 arranged in a matrix or two-dimensional array of N columns and N rows or of first to tenth columns from right to left and first to tenth rows from bottom to top. The forward bit cells 83 of each row, such as the third row indicated in a dotted-line rectangle is called the forward source entry unit mentioned before and is now designated by a reference numeral with a suffix as 83(1). As exemplified along the first and the tenth columns in dotted-line rectangles, the forward bit cells 83 of each column is referred to as a forward destination entry unit 83(2). Each of such first to N-th forward source and destination entry units 83(1) and 83(2) is used in connection with each instruction. Such instructions will be numbered as first to tenth instructions with no regard to simultaneous fetching or decoding of the instructions. For example, an n(column)-th one of the forward destination entry units 83(2) is for an n(column)-th instruction. An n(row)-th one of the forward source entry units 83(1) is for an n(row)-th instruction.

Each of the forward map bit cells 83 is for storing two binary bits each as a forward one bit datum to indicate the dependency of two instructions in the registers 39 (FIG. 1). These two binary bits will be called a first bit a and a second bit b. For example, a result stored in one of the registers 39 for an instruction may or may not be for use as the operand of another instruction. If the result of an n(row)-th instruction is used as the laevooperand of an n(column)-th instruction, the first bit is given a binary one value in the forward bit cell 83 of the n(column)-th column and the n(row)-th row. If the result of the n(row)-th instruction is used as the dextrooperand of the n(column)-th instruction, the second bit is given the binary one value in the forward bit cell 83 under consideration. If not so used, a binary zero value is given to a pertinent one of the first and the second bits. When n(row) is greater than n(column), there is no dependency between the n(column)-th and the n(row)-th instructions.

In this manner, 2N binary bits in each forward source entry unit 83(1) indicate use of such preconfirmed results by which of the instructions as which of the laevooperands and the dextrooperands. The first to the N-th forward source entry units 83(1) are connected to the first to the N-th forward map control terminals 61(c1) to 61(cN), respectively, Similarly, 2N binary bits in each forward destination entry units 83(2) indicate production of the laevooperands and the dextrooperands of an instruction as the results of which of the instructions. If the 2N binary bits are all binary zero bits in one of the forward destination entry units 82(2), it is indicated that the operands of an instruction are the results of none of prior executed instructions. The first to the N-th forward destination entry units 83(2) are connected to the first to the N-th forward map output terminals 61(o1) to 61(oN), respectively. It will later become clear that the forward map buffer 61 is for forwarding the preconfirmed results to the laevooperand and the dextrooperand areas 79(3) and 79(4) of the preissued instructions stored in the instruction store buffer 63 when the data dependency is present between the preconfirmed results and the operands of the preissued instructions. In this manner, the forward map buffer 61 stores a forward map.

In the manner depicted in a top row near the right-hand end, the register map buffer 65 comprises a plurality of register bit cells 85 arranged in a two-dimensional matrix of zeroth to M-th columns in correspondence to the registers 39 (FIG. 1), respectively, and of first to N-th rows, where M represents the ordinal number of the registers 39 less one. In other words, the registers 39 have register numbers m which varies from zero to M for (m+1)-th registers. The register bit cells 85 of each row is referred to as a register bit unit 87 in the manner exemplified in a dotted-line rectangle along the fifth row. Such first to N-th register bit units 87 are used in connection with first to N-th instructions, respectively, and are connected in common to the read and the write register indication terminals 65(i1) and 65(i2).

It may be mentioned here that each instruction code or decoded instruction may specify in the manner known in the art one of the registers 39 as a specified register for read a datum therefrom and write a datum therein. When an n-th instruction specifies an m-th register as the specific register and does not, binary one and zero bits are stored in the n-th row (m−1)-th column register bit cell 86, respectively, In this manner, the n-th register bit unit 87 indicates those of the registers 39 in which data should be stored for the n-th instruction, As will later become clear, the register map buffer 65 confirms the dependency as regards each of the instructions administrated by the instruction parallel issue and execution administrating device 31 primarily to renew, if necessary, the forward map in the forward map buffer 61 and to specify those result values in the result value buffer 67 which should be stored in the laevooperand and the dextrooperand areas 79(3) and 79(4) of the instruction store buffer 79.

In this manner, the forward map buffer 61 and the register map buffer 65 are for the forward map and for register write data which are also as a bit map. As herein called, the bit map refers to, for example, storage of a register write-in datum of the m-th register 39 in the register bit cell 85 of the (m−1)-th column. Storage of the data dependency and the register write-in datum as such bit maps is for simplifying a hardware structure on dynamically administrating instruction parallel issue and execution in the superscalar processor.

In a top rightmost area of FIG. 5, the result value buffer 67 comprises a plurality of result value entry units 89 arranged in first to N-th rows as first to N-th result value entry units 89 in the manner exemplified by a dotted-line rectangle along the third row. Each result value entry unit 89 comprises an execution flag area 89(1) for an execution flag and a result value area 89(2). Like the first to the N-th register bit units 87, the first to the N-th result value entry units 89 are for the first to the N-th instructions, respectively, and are therefore enclosed with a common dotted-line rectangle as exemplified along the first bit unit 87 and the first result value entry unit 89. Connected to the first result buffer output terminal 67(o1) and thence to the register file terminal 31(iii) and to the second result buffer terminal 67(o2), the result value areas 89(2) of the first to the N-th result value entry units 89 are for storing as result values the data supplied through the result input terminal 31(viii) and the result value input terminal 67(i). For convenience of the description in the following, the n-th instruction store entry unit 79, the n-th forward destination entry unit 83(2), the n-th bit entry unit 87, and the n-th result value entry unit 89 will collectively be called an n-th instruction information entry unit 91 as exemplified in dotted-line rectangles for n=1.

As depicted in a right bottom area of FIG. 5, the instruction issue buffer 69 comprises first to third instruction issue entry units depicted along rows for up to three preissue instructions which should simultaneously issued in parallel. Each instruction issue entry unit comprises a code area 69(1) connected to the code output terminal 63(o1) and to the access instruction issue terminal, a laevooperand area 69(2) connected to the instruction input terminal 69(i) and the laevooperand output terminal 63(o2) and to the first instruction issue terminal 31(vi), and a dextrooperand area 69(3) connected to the instruction input terminal 69(i) and the dextrooperand output terminal 63(o3) and to the second instruction issue terminal 31(vii).

Information stored in the instruction store buffer 63, the forward map buffer 61, the register map buffer 65, and the result value buffer 67 will be summarized in connection with the n-th preissued instruction. An issue flag, the instruction code, the laevooperand, and the dextrooperand are stored in the n-th instruction store entry unit 79. The n-th forward destination entry unit 83(2) stores for use as the operand the result or results of which of the instructions. The results of the n-th instruction is stored in one of the forward bit cells 83 of the n-th forward source entry unit 83(1) that is for which of the instruction should use this result as its operand. The register 39 is stored in the n-th register bit unit 87. The issue flag and the result value are stored in the n-th result value entry unit 89. In this manner, the n-th instruction information entry unit 91 is used together with the n-th forward source entry unit 83(1).

In the issue flag area 79(1), the issue flag selectively specifies first to fifth issue states as follows. Each of these issue states indicates a state in which issued is the n-th instruction having its instruction information stored in the n-th instruction information entry unit 91. The first issue state is represented by an abbreviation "em" and indicates that the n-th instruction information entry unit is "empty", namely, stores no effective instruction information. The second issue state is represented by an abbreviation "nr" and indicates that the n-th instruction is in a "not ready" state in which its decoded result alone has already been stored and in which the n-th instruction is before confirmation as regards whether or not the n-th instruction can actually be issued. The third issue state is represented by "rd" indicative of a "ready" state in which its operand or operands are all ready so that the n-th instruction can be issued. The fourth issue state is a "wa" state indicative of a "waiting" state in which the n-th instruction is waiting for the ready state because its operand or operands are not yet ready. The fifth issue state is represented by "is" indicative of an "issued" state in which the n-th instruction is already issued.

In the execution flag area 89(1), the execution flag selectively specifies first to sixth execution states as follows, each indicating a state of execution of the n-th instruction with its instruction information stored in the n-th instruction issue entry unit 91. The first execution state is represented by an abbreviation "em" indicative of an "empty" state in which no effective instruction information is stored in the n-th instruction information entry unit 91. The second execution state is represented by "ni" indicative of a "not issued" state in which the n-th instruction is not yet issued. The third execution state is represented by "ex" indicative of an "executing" state in which execution of the n-th instruction is in progress, as by referring to the memory access unit 41 of FIG. 1 or to one of the first and the second arithmetic units 47(1) and 47(2). The fourth execution state is represented by "es" indicative of an "executing on speculation" state in which the n-th instruction is issued while put in a state of speculation in response to a branch prediction, namely, in a provisionally executing state of referring to the memory access unit 41 or to one of the first and the second arithmetic units 47(1) and 47(2) in response to the branch prediction. The fifth execution state is represented by "do" indicative of a "done" state in which execution to have provided its result or results. The sixth execution state is represented by "ds" indicative of a "done on speculation" state in which execution of the n-th instruction in the state of speculation has come to a provisional end to give a preconfirmed result or results.

In the issue and the execution flag areas 79(1) and 89(1), the issue and the execution flags are simultaneously made to indicate the "em" state. When the issue flag specifies one of the "nr", the "rd", and the "wa" states, the execution flag indicates the "ni" state. When the execution flag indicates one of the "ex", the "es", the "do", and the "ds" states, the issue flag indicates the "is" state. When the n-th instruction is the preissue instruction, the issue flag indicates one of the "nr", the "rd", and the "wa" states. For the in execution instruction, the execution flag indicates one of the "ex" and the "es" states. For the preconfirmed instruction, the execution flag indicates one of the "do" and the "ds" states. A result of execution of the n-th instruction is confirmed when its execution flag indicates the "do" state and furthermore when the execution flag of each of prior executed instructions also specifies the "do" state. The instruction flag indicative of one of the "es" and the "ds" states represents that the branch prediction is found correct with the state of speculation solved and with the execution flag put in the "ex" and the "do" states. If the branch prediction for the n-th instruction is found incorrect, cancelled are in execution instructions following the n-th instruction and also preconfirmed results of the preconfirmed instructions.

Referring temporarily to FIG. 6, it will be surmised that a pipeline operation is carried out with a pipeline timing illustrated therein by the processor depicted in FIG. 1 in the dashed-line rectangle. Two basic pipeline timings are exemplified so as to simplify the following description and are based on a typical pipeline operation of a conventional superscalar processor. A memory access instruction uses a six-stage pipeline operation. An arithmetic (ALU) or a branch instruction uses a five-stage pipeline operation. In such pipeline stages, a symbol "IF" represents "instruction fetch". A symbol "ID" represents "instruction decode". A symbol "DP" represents "instruction dispatch". Symbols "EX1" and "EX2" are representative of "execution" of an instruction. A symbol "WB" represents "write-in into either a register or memory". When an instruction can not be immediately dispatched or issued, the "DP" stage may be repeated in a plurality of cycles. If a datum is absent in the data cache 43 exemplified in FIG. 1, the "EX1" stage may continue during a plurality of cycles.

Further turning to FIG. 7 with FIGS. 1 and 6 additionally referred to, the instruction parallel issue and execution administrating device 31 deals with the "IF", the "DP", the "EX2", and the "WB" pipeline stages in eight fundamental operations as will presently be described, with each cycle processed in a former and a latter half. In the former half of the "ID" stage, none of the fundamental operations is carried out in the manner indicated by a dash. In the latter half, an instruction store operation is carried out as a first fundamental operation. In the former half of the "DP" stage, an operand fetch operation is carried out. In the latter half, an operand store and an instruction dispatch operation are carried out. In the former half of the "EX2" stage, an operand forwarding reservation operation is carried out. In the latter half, an operand bypassing operation is carried out. In the former half of the "WB" stage, an execution completing operation is carried out. In the latter half, an operand forwarding operation is carried out. Incidentally, the operand fetch and the operand store operations are processed only once in the former and the latter halves of the "DP" stage that is carried out for the first time when the "DP" stage is repeatedly processed in a plurality of times.

Referring again to FIGS. 1 and 4 to 6 and using the abbreviations for the issue and the execution flags, the eight fundamental operations are processed as follows. It should be noted that the instruction parallel issue and execution administrating device 31 is capable of processing each of the fundamental operations concurrently on a plurality of instructions in parallel or a plurality of the fundamental operations in parallel.

At first, the instruction store operation will be described. Supplied from the instruction fetch and decode device 35 through the instruction code (or decoded instruction) input terminal 31(i), a plurality of instruction information or data are stored in idle or empty ones of the first to the N-th instruction information entry units 91. As described before, the instruction information comprises the instruction codes, the register write data, the register read data, and/or the data dependencies in the registers 39 between parallel decoded instructions. More particularly, the instruction codes are stored in the instruction code areas 79(2) through the instruction input terminal 63(i1). The register write data are stored in the register bit units 87 through the write register indication terminal 65(i2). The dependencies are stored through the forward map store terminal 61(i1) in the forward destination entry units 83(2) as forward map data. It will be assumed in connection with the forward map data that the laevooperand of the n(column)-th instruction depends on the result of execution of the n(row)-th instruction. In this event, the binary one bit is stored in the first bit a in the n(column)-th forward bit cell 83 in the n-th (or, n(column)-th) forward map data entry 83(2). If the dependency relates to the dextrooperand, the binary one bit is stored as the second bit b.

In the meantime, the instruction execution control unit 71 and the instruction issue control unit 75 indicate in which of the instruction information entry units 91 the data should be stored so that the stored data are aligned in correspondence to a fetch and decode order in which the instructions are sequentially fetched and decoded. Inasmuch as both the issue and the execution flags indicate the "em" state in each of the idle ones of the instruction information entry units 91, the instruction execution control unit 71 specifies the idle ones from a least-numbered one up to a greatest-numbered one in an ascending order of 1 to N and turns the issue flag to the "nr" state and the execution flag to the "ni" state.

Secondly, the operand fetch operation will be described. In response to the decoded instruction received through the read register indication terminal 65(i1) to indicate register read-out information, the register map buffer 65 checks all register bit entries 87 whether or not those of the register bit entries 87 are present which include the register bit cell 85 indicative of the register 39 to be read to provide an operand. Information representative of results of check is delivered through the register map control terminals 65(c1) to 65(cN) to the operand forwarding control unit 73.

In response, the operand forwarding control unit 73 checks whether or not those pertinent ones are present in the register bit entries 87 which indicate the register 39 to be read and furthermore which are connected through pertinent ones of the register write terminals 65(o1) to 65(oN), the instruction execution control terminals 71(c1) to 71(cN), and the result buffer input terminals 67(i1) to 67(iN) to relevant one of the result value entry units 89 storing the execution flags indicative of other than "em" states. When the pertinent ones of the register bit entries 87 are absent, it is possible to read the operand from the register 39. Responsive to signals supplied through the pertinent ones of the register write terminals 65(o1) to 65(oN), the operand forwarding control unit 73 transfers the register read-out information to the registers 39 through the register read request terminal and the register file read control terminal 31(ii).

It will now be presumed that the pertinent ones of the register bit entries 87 are present. The operand forwarding control unit 73 first specifies one alone of the pertinent ones of the register bit entries 87 as an effective register bit entry 87(e) that are found present. The effective register bit entry 87(e) is specified by one of the instructions that is most recent among prior instructions fetched and decoded earlier than the instruction requesting the operand.

As soon as the effective register bit entry 87(e) is identified, the operand forwarding control unit 73 requests through the forward map control terminals 61(c1) to 61(cN) the forward map buffer 61 renew or refresh of the forward map. It will be assumed on describing this renewal that the n(row)-th instruction is the above-mentioned one of the instructions that corresponds to the effective register bit entry 87(e) and that the operand is the laevooperand registered by the n(column)-th instruction. Under the circumstances, the forward map buffer 61 is supplied through one of the forward map control terminals 61(c1) to 61(cN) the information of the n(row)-th instruction and through the forward map renewal control terminal 61(i2) the information which indicates that the laevooperand of the n(column)-th instruction is the operand requested. In response, the binary one bit is set at the first bit a in the n(column)-th register bit cell 85 of the n(row)-th forward source bit entry 83(1). When the dextrooperand is requested, the binary one bit is set at the second bit b. In this manner, the forward map is renewed for read out through the forward map output terminals 61(o1) to 61(oN) from the forward destination bit entry units 83(2).

As soon as the effective bit entry 87(e) is identified, the operand forwarding control unit 73 becomes to transfer a preconfirmed result read-out request to the result value buffer 67 through the instruction execution control terminals 71(c1) to 71(cN) and the result buffer input terminals 67(i1) to 67(iN). In response, the result value buffer 67 delivers a preconfirmed result through the second buffer output terminal 67(o2) from each of the result value entry units 89 that stores the execution flag indicative of either the "do" or the "ds" state.

From one of or both of the register file 37 and the register value buffer 67, all operands for the instructions being processed are stored in pertinent ones of the instruction store units 79 through the laevooperand and/or the dextrooperand input terminals 63(i2) and 63(i3). It is described before that the instruction codes are stored in their instruction code areas 79(2) through the instruction input terminal 67(i1). Through the instruction buffer control terminals, the instruction issue control unit 75 sets the issue flags to the "rd" state in these pertinent ones of the instruction store units 79.

Thirdly, the operand store operation will be described. During this operation, the laevooperand and the dextrooperand are stored in the laevooperand and the dextrooperand areas 79(3) and 79(4), respectively, in response to the operand request information supplied to the decoded instruction input terminal 31(i). In response, one or two of the registers 39 are specified to deliver the laevooperand alone or both the laevooperand the dextrooperand to the operand input terminals 63(*i*2) and 63(*i*3) through the register file read data terminal 31(iv). Alternatively, the laevooperand or the laevooperand and the dextrooperand are delivered from the second result buffer output terminal 67(*o*2) from the result value entry unit or units 89 in which the preconfirmed result or results are stored through the result input terminal 31(viii) and the result value input terminal 67(*i*).

In the fourth place, the instruction dispatch operation will be described. Supplied with a preissue instruction through the instruction execution input terminal 71(*i*), the instruction execution control unit 71 activates through the second instruction execution output terminal 71(*o*2) the instruction issue control unit 75. Activated, the instruction issue control unit 75 searches through the instruction buffer control terminals the instruction store entry units 79 in which the issue flags indicate the "rd" state. From such searched ones of the instruction store entry units 79, instruction dispatch entry units 79(*d*) are selected in the manner which will become clear as the description proceeds. Through the code, the laevooperand, and the dextrooperand output terminals 63(*o*1) to 63(*o*3), contents of the instruction dispatch entry units 79(*d*) are dispatched to the instruction issue buffer 69.

In the fifth place, the operand forwarding reservation operation will be described. Responsive to the preissued instruction, the instruction execution control unit 71 sends a forward source instruction indication through the register map control terminals 65(*c*1) to 65(*c*N), the operand forwarding control unit 73, and the forward map control terminals 61(*c*1) to 61(*c*N) to the forward source entry units 83(1). Accessed by the forward source instruction indication, the n(row)-th forward source entry unit 83(1) may deliver its 2N-bit information through one of the forward map output terminals 61(*o*1) to 61(*o*N) to specify one of the instruction store entry units 79 in which the result of a specific instruction should be stored. In the meanwhile, the instruction issue control unit 75 is activated in the manner described in the foregoing to find the issue flags indicative, in the instruction store entry units 79, of the "nr" or the "wa" state. In such found ones of the instruction store entry units 79, the instruction issue control unit 75 checks to turn the issue flag into the "rd" state whether or not the operands are all stored.

As described before, the information of the n(row)-th forward entry unit 83(1) is temporarily stored in the forward source entry buffer 77. Stored in the forward source entry buffer 77, the information is used in forwarding the laevooperand or the laevooperand and the dextrooperand to the instruction store entry unit 79.

In the sixth place, the operand bypassing operation will be described. It may happen that the issue flag is set at the "rd" state in one of the instruction store entry units 79 in which all operands are not yet stored by the operand forwarding reservation operation described above. The instruction issue operation would transfer the instruction information of such an instruction store entry unit 79 in this case to the instruction issue buffer 69 to issue a defective instruction in which the operand or operands are missing. Such a defective issue may take place also when the operand or operands are either read from the register file 37 or supplied through the result input terminal 31(viii). The operand bypassing operation copes with such circumstances by directly bypassing the operand or operands from the result input terminal 31(viii) to the instruction input terminal as follows.

In the operand bypassing operation carried out in the latter half of the "EX2" stage, results are produced by the memory access unit 41 or by one or both of the first and the second arithmetic units 47(1) and 47(2) and are delivered through the result bus 45 to the result input terminal 31(viii). If an instruction code is present in the operand area 69(1) which requires its operand or operands, such operands are stored through the instruction input terminal 69(*i*) in the laevooperand and the dextrooperand areas 69(2) and 69(3). It should be known here that the instruction issue control unit 75 refers to the instruction store entry units 79 through the instruction buffer control terminals 63(*i*1) to 63(*i*N) and judges necessity or unnecessity of the operands to control the instruction issue buffer 69 through the instruction issue control terminal 69(*c*).

In the seventh place, the execution completing operation will be described. In this operation, the results delivered through the result input terminal 31(viii) are stored in one of the result value entry units 89 that corresponds to the instruction being executed. Furthermore, the execution flag is set at the "do" or the "ds" state in this one of the result value entry units 89. It should be known in this connection that it is already rendered possible to refer to the results stored in the result value entry unit 89 under consideration by the operand fetch operation carried out in connection with others of the instructions that are processed in the cycle being in progress.

Finally in the eighth place, the operand forwarding operation will be described. It is noted here in connection with the operand forwarding reservation operation described in the fifth place that the specific instruction is defined, of which the result is stored in a specified one of the instruction store entry units 79. In the operand forwarding operation carried out in the latter half of the "WB" stage of this specific instruction, the results are actually stored in the laevooperand and the dextrooperand areas 79(3) and 79(4).

For this actual storage, one of pairs of the laevooperand and the dextrooperand areas 79(3) and 79(4) and one set of the results are indicated by contents of the forward source entry units 83(1) which are temporarily stored in the forward source entry buffer 77 during the operand forwarding reservation operation of the specific instruction. More specifically, the results are forwarded for the actual storage to one pair of the laevooperand and the dextrooperand areas 79(3) and 79(4), in relation to which the forward source entry buffer 77 stores a pair of binary one bits in correspondence to the forward map stored in the forward source entry units 83(1).

FIG. 8 will now be referred to with FIGS. 1 and 4 to 7 additionally referred to in order to more clarify the description of the eight fundamental operations. For this purpose, the pipeline operation is depicted for two instructions having the data dependency in the register file 37, assuming three different pipeline timings depicted in FIG. 8 at (A), (B), and (C). In the following, the two instruc-tions are called first and second instructions depicted at top and bottom of each of (A) to (C) in FIG. 8. The data dependency is to use the results of execution of the first instruction as the operands in the second instruction. That is, the "EX2" stage of the second instruction is executed in parallel either simultaneously with or later than the "WB" stage of the first instruc-tion.

In FIG. 8 at (A), the first and the second instructions are concurrently fetched and decoded. For the first instruction, the issue flag is set at the "rd" state in the operand fetch operation of the "DP" stage because its operand are all ready. The first instruction is therefore selected for actual issue in the instruction dispatch operation of the "DP" stage and is executed in the "EX2" stage. For the second instruction, it is indicated in the instruction store operation of the "ID" stage that the forward map is stored in the forward destination entry unit 83(2) to show the data dependency such that further prosecution of the second instruction depends on the results of execution of the first instruction. In the operand fetch operation of the "DP" stage processed for the first time, it is assumed that the operands are not ready to an extent required. The issue flag is therefore set at the "wa" state. In the operand forwarding reservation operation of the "EX2" stage of the first instruction, the fact becomes clear that the forward map is used to produce in the next cycle, as the results of execution of the first instruction, the operands which the second instruction will use in the further prosecution. The issue flag of the second instruction is therefore turned to the "rd" state. This makes carry out of the operand bypassing operation of the "EX2" stage for the first instruction to store the results of execution in the instruction issue buffer 69 simultaneously with selection of the second instruction as an object of issue in the instruction dispatch stage of the "DP" stage processed for the second time so that the second instruction proceeds to the "EX2" stage. The results of execution of the first operands are forwarded to the result value buffer 67 and the instruction store buffer 63 by the execution completing and the operand forwarding operations of the "WB" stage. For storage in the instruction store buffer 63, use is made of the forward map stored in the forward source entry buffer 77 by the operand forwarding reservation operation of the "EX2" stage of the first instruction.

In FIG. 8 at (B), the first and the second instructions are fetched and decoded with timing which are one cycle shifted from each other. For the first instruction, the operands are all ready by the operand fetch operation of the "DP" stage with its issue flag set at the "rd" state. The first instruction is therefore selected in the instruction dispatch operation for actual issue and is executed in the "EX2" stage. For the second instruction, it is indicated in the operand fetch operation of the "DP" stage that its operands are not yet delivered to the result value buffer 67 and are not in completion with a result that the issue flag therefor is set at the "wa" state. In this operand fetch operation, the forward map is renewed by storing the binary one bits in the forward bit cell 83 corresponding to the second instruction in the forward destination entry unit 83(2) for the first instruction so that the results of execution of the first instruction may be used by the second instruction. It should be noted here that the operand forwarding reservation operation of the "EX2" stage of the first instruction is processed concurrently with the operand fetch operation of the "DP" stage of the second instruction and that it is possible to simultaneously read the forward map after the renewal. As a consequence, it is possible to know that the results of the first instruction give rise to production of the operands which the second instruction will require in the following stages. This turns the issue flag for the second to the "rd" state. This further makes the instruction dispatch operation of the "DP" stage under consideration select the second instruction for actual issue and, at the same time, the operand bypassing operation bypass the results of the first instruction to the instruction issue buffer 69 so as to enable execution of the second instruction. In the manner described in connection with concurrent fetch and decode of the first and the second instructions, the results of the first instruction are forwarded to the result value buffer 67 and the instruction store buffer 63 by the execution completing and the operand forwarding operations of the "WB" stage. Stored in the forward source entry buffer 77 by the operand forwarding stage of the "EX2" stage of the first instruction, the forward map is used for storage in the instruction store buffer 63.

In FIG. 8 at (C), the first and the second instructions are fetched and decoded with a shift of two cycles to simultaneously deal with the "EX2" stage of the first instruction and the "ID" stage of the second instruction at a common pipeline timing and also the "WB" stage of the first instruction and the "DP" stage of the second instruction. In the operand forwarding reservation operation of the "EX2" stage of the first instruction when the second instruction is still in the "ID" stage, it is not yet certain whether or not the results of the first instruction should be forwarded for the second instruction. In the "WB" stage of the first instruction, the execution completing operation stores the results in the result value buffer 67. In the operand fetch operation of the "DP" stage of the second instruction, the forward map is stored or renewed to indicate how to use the results of the first instruction as the operands of the second instruction. It is, however, possible in this case to read the results stored in the result value buffer 67. As a consequence, the operands are ready for the second instruction so that the second instruction can be further prosecuted. This enables to get the operands by reading the result value buffer 67 without processing the operand forwarding and bypassing operations.

Referring to FIGS. 9 to 20 and repeatedly to FIGS. 1 and 4 to 8, operation of the instruction parallel issue and execution administrating device 31 will be described in greater detail. For this purpose, a simple instruction code sequence will be taken into consideration.

In FIG. 9, the instruction code sequence is exemplified as a sequence of first to ninth instructions, together with a description of each instruction, in a solid-line rectangle with rounded corners. Ordinal numbers indicative of the instructions are described in lower-case Roman numerals leftwardly out of the solidline rectangle along respective rows of the instructions. In the instructions, "r0", "r1", and so on represent the register numbers m described before in conjunction with the register bit cells 85.

The instruction codes are described along a leftmost or first column. Along a second column, the registers 39 are described in which the results should be written. Along third and fourth columns, the registers 39 are described from which should be read the laevooperands and the dextrooperands. In each instruction, none of the registers 39 is described when unnecessary. It should be noted in connection with the seventh instruction (vii) that a notation "LL" defines in the manner defined along a bottom row the ninth instruction (ix).

It will be presumed in the following merely by way of example that data are stored in the zeroth through the seventh registers r0 to r7 as follows initially before execution of the instructions. It should, however, be noted that these data may vary individually or be refreshed during progress of the execution.

r0: 0; r1: 1; r2: 2; r3: 3; r4: 4; r5: 5; r6: 6; and r7: 7.

In FIG. 10, the pipeline timings of the first to the ninth instructions are depicted, where t represents a pipeline cycle number. In the manner so far presumed, three instructions are simultaneously fetched and decoded. Up to three instructions are concurrently processed when each set of their operands is ready while the pipeline cycle number increases up to ten and execution of the instruction sequence of the example comes to an end.

Figure 11A:
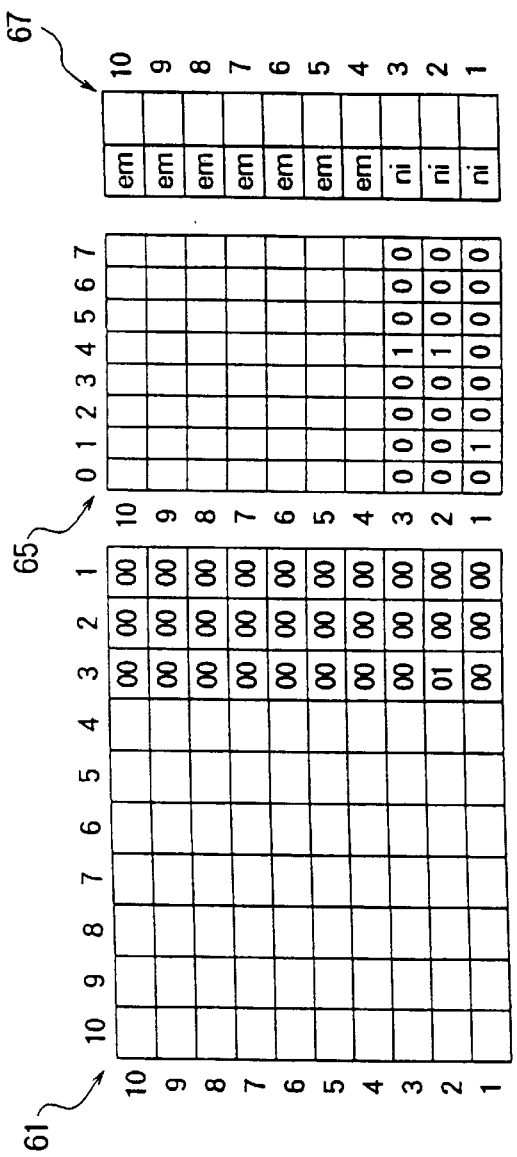
Figure 11B:
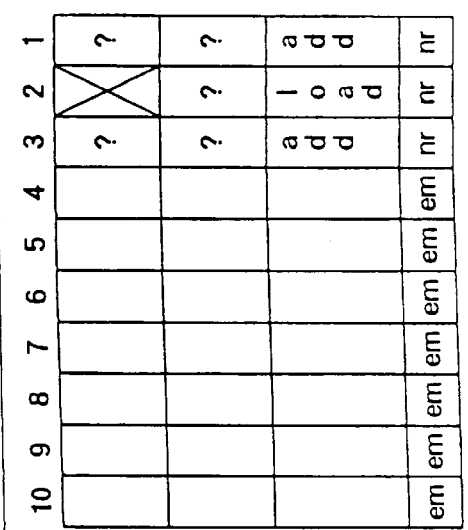
Figure 20A:
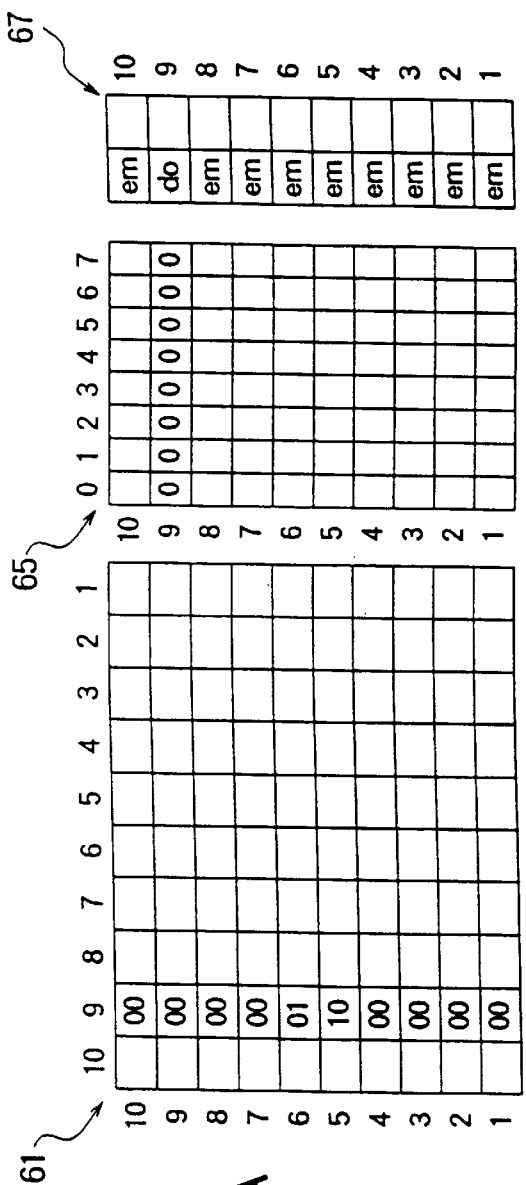
Figure 20B:
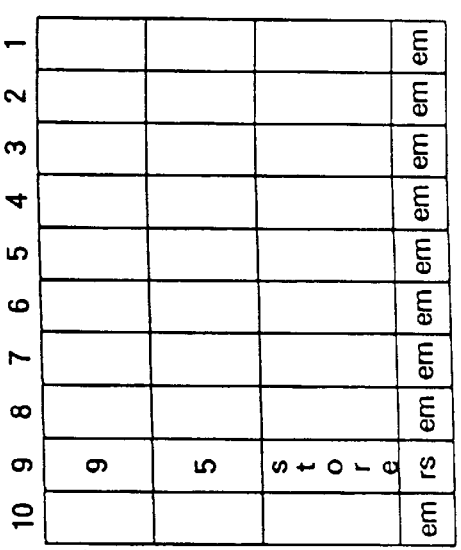

In FIGS. 11 and 20, the forward map buffer 61, the instruction store buffer 63, the register map buffer 65, the result value buffer 67, and the instruction issue buffer 69 should be understood to have their cells and units arranged and designated by the reference numbers illustrated with reference to FIG. 5 together with the numbers represented by N and M. At each pipeline cycle number t=j (where j represents one of 1 to 10), represented are results of execution obtained in a j-th cycle before start of a (j+1)-th cycle. In each of the dextrooperand areas 79(4) and 69(3) of the instruction store and the instruction issue buffers 63 and 69, a cross is written over the whole area when the dextrooperand is not used. In each of the laevooperand and the dextrooperand areas 79(3) and 79(4), a question mark is written when such an area 79(3) or 79(4) should be used but is not yet actually supplied with a datum to be stored therein. The issue and the execution flags are indicated by the abbreviations described before in relation to the issue and the execution flag area 79(1) and 89(1) immediately before the description proceeds to FIG. 6 and then to FIG. 7.

In FIG. 11 where t=1, the first to the third instructions are in the "ID" stage with the instruction storing operation completed. Their codes are stored in the instruction store buffer 63. In the forward source entry unit 83(1) of the third column which is used in the forward map buffer 61 currently by the third instruction, the binary one bit is stored as the second bit of the second-row forward bit cell 83 to indicate that the result of the second instruction should be used as the dextrooperand of the third instruction. In the register map buffer 65, the binary one bits are stored in the register bit cells 85 corresponding in the register bit units 87 for the first to the third instructions to the register numbers of the registers 39 in which the results of execution of the first to the third instructions should be stored. In the instruction store buffer 63, only the instruction codes are stored in the instruction store entry units 79 of the first to the third columns. The issue flags are therefore set at the "nr" state in the issue flag areas 79(1) of these columns. In the result value buffer 67, the execution flag is set at the "ni" state in each of the result value entry units 89 of the first to the third rows.

Figures 12A, 12B:
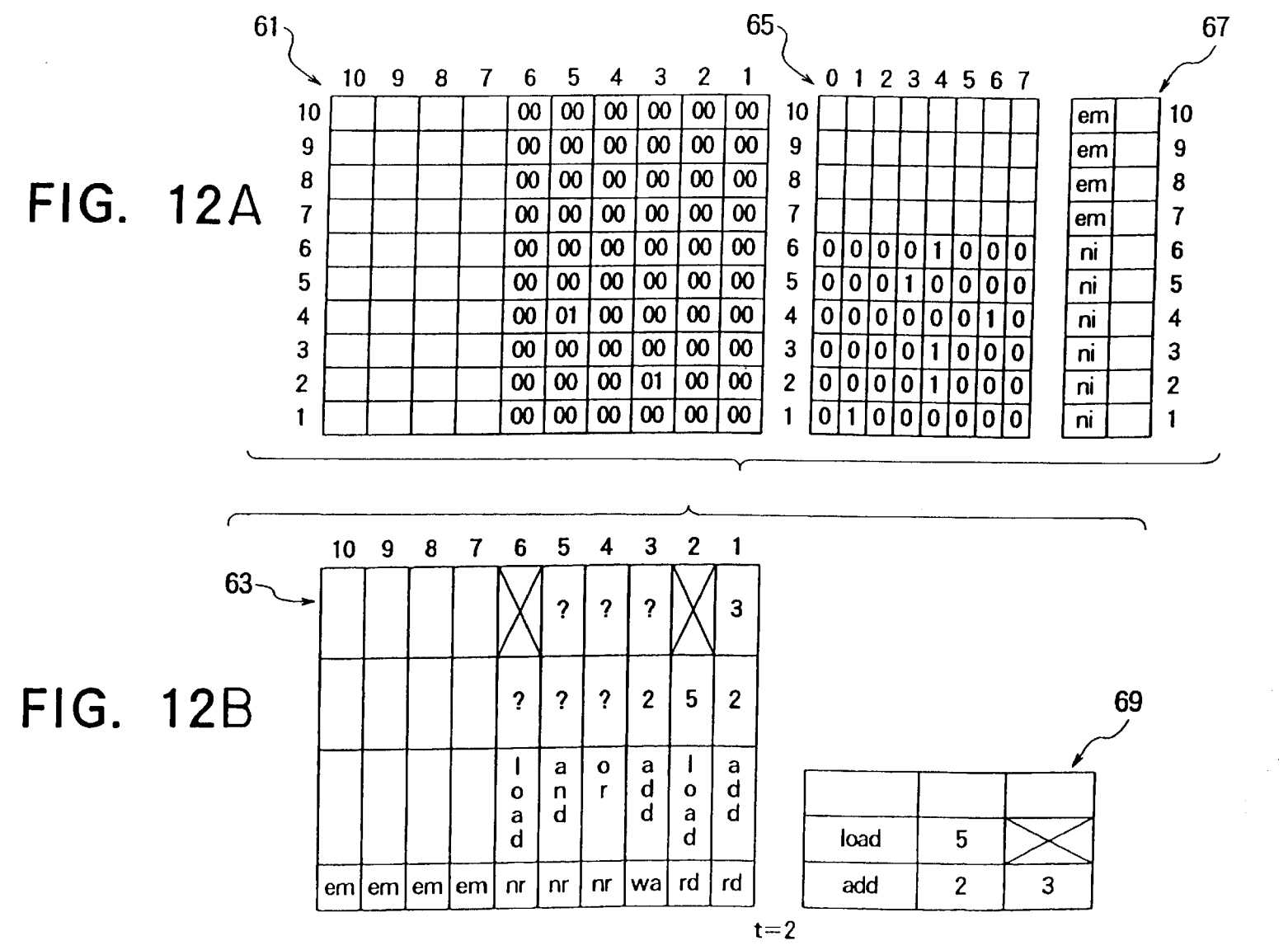

In FIG. 12 where t=2, the first to the third instructions proceed to the "DP" stage. From the registers r2, r3, r5, and again r2 indicated by these instructions except for the register r4 indicated by the third instruction to produce its dextrooperand which is the result of the second instruction, the data are stored in pertinent ones of the laevooperand and the dextrooperand areas 79(3) and 79(4) of the instruction store buffer 63. With the operands all ready, the issue flags are turned to the "rd" state for the first and the second instructions, which are therefore dispatched to and stored in the instruction issue buffer 69 by the instruction dispatch operation. As for the third instruction, the issue flag is put to indicate the "wa" state in correspondence to the fact that its dextrooperand is not yet stored in the instruction store buffer 63. The fourth to the sixth instructions are put in the "ID" stage. The execution flags are set at the "ni" state for the first to the sixth instructions.

Figures 13A, 13B:
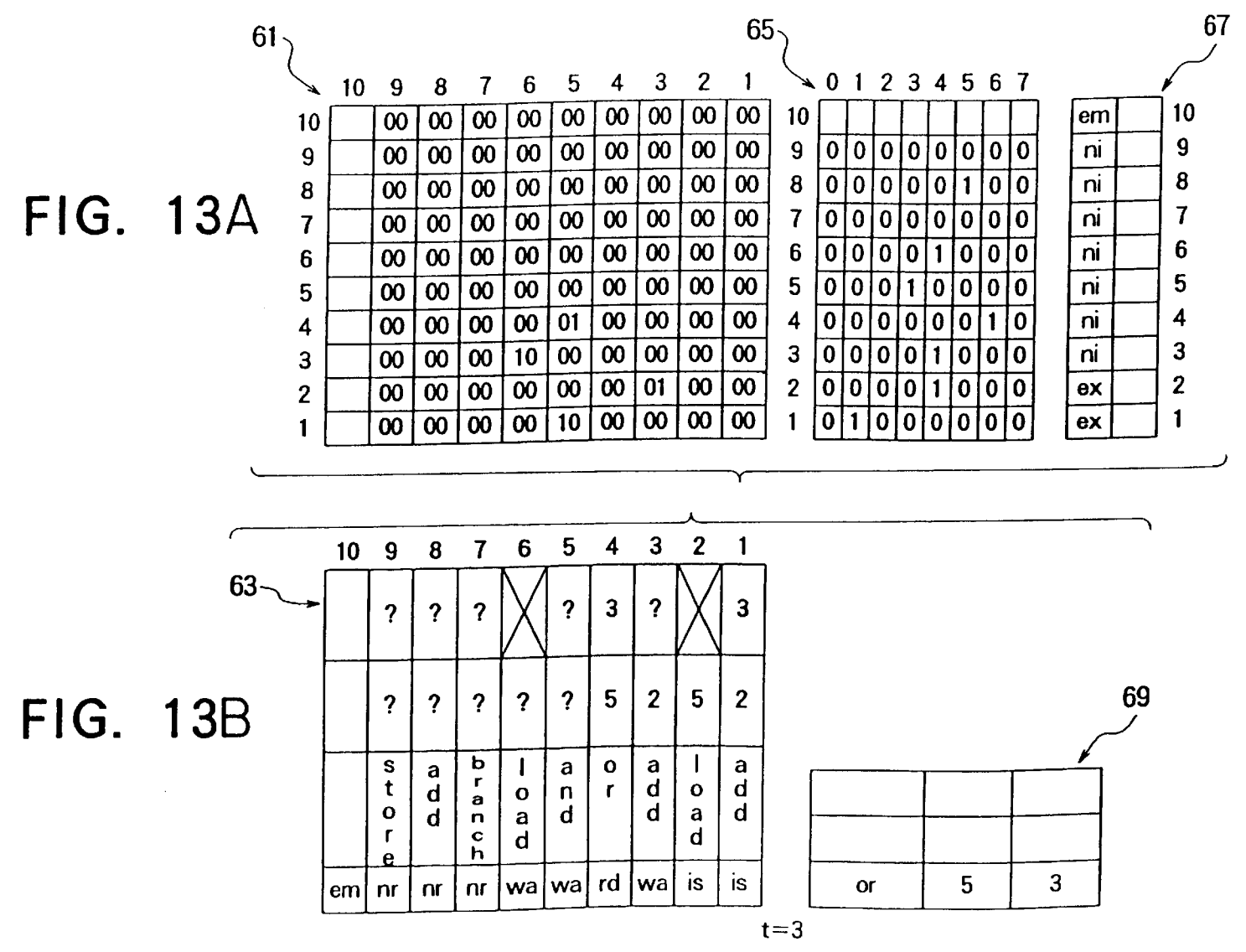

In FIG. 13 where t=3, the first and the second instructions are issued from the instruction issue buffer 69 and are in the "EX2" and the "EX1" stages, respectively, with their instruction information kept in the first and the second instruction entry units 91. The issue and the execution flags are switched to the "is" and the "ex" states. In accordance with the results of execution of the first and the second instructions, the data of the registers r1 and r4 are re-written both into 5. The third instruction is still in the "DP" stage with its issue flag kept at the "wa" state.

The fourth to the sixth instructions proceed to the "DP" stage. As for the fourth instruction, its operands are fully stored in the instruction store buffer 63 with its issue flag switched to the "rd" state. The fourth instruction is therefore dispatched into the instruction issue buffer 69. During the operand fetch operation of the "DP" stage, it becomes clear that the laevooperand of the fifth instruction should be the datum of the register r1, which is renewed by the execution of the first instruction. The forward map is therefore renewed to store the binary one bit as the first bit in the forward bit cell 83 corresponding in column to the fifth instruction and in row to the first instruction. Similarly, the first bit is refreshed to the binary one bit in the forward bit code 83 of the sixth column and the third row. For each of the fifth and the sixth instructions, the issue flag is turned to the "wa" state. The seventh to the ninth instructions are fetched and decoded with their instruction codes stored in the instruction store buffer 63. Incidentally, the register r4 is later updated by the result of the third instruction.

Figures 14A, 14B:
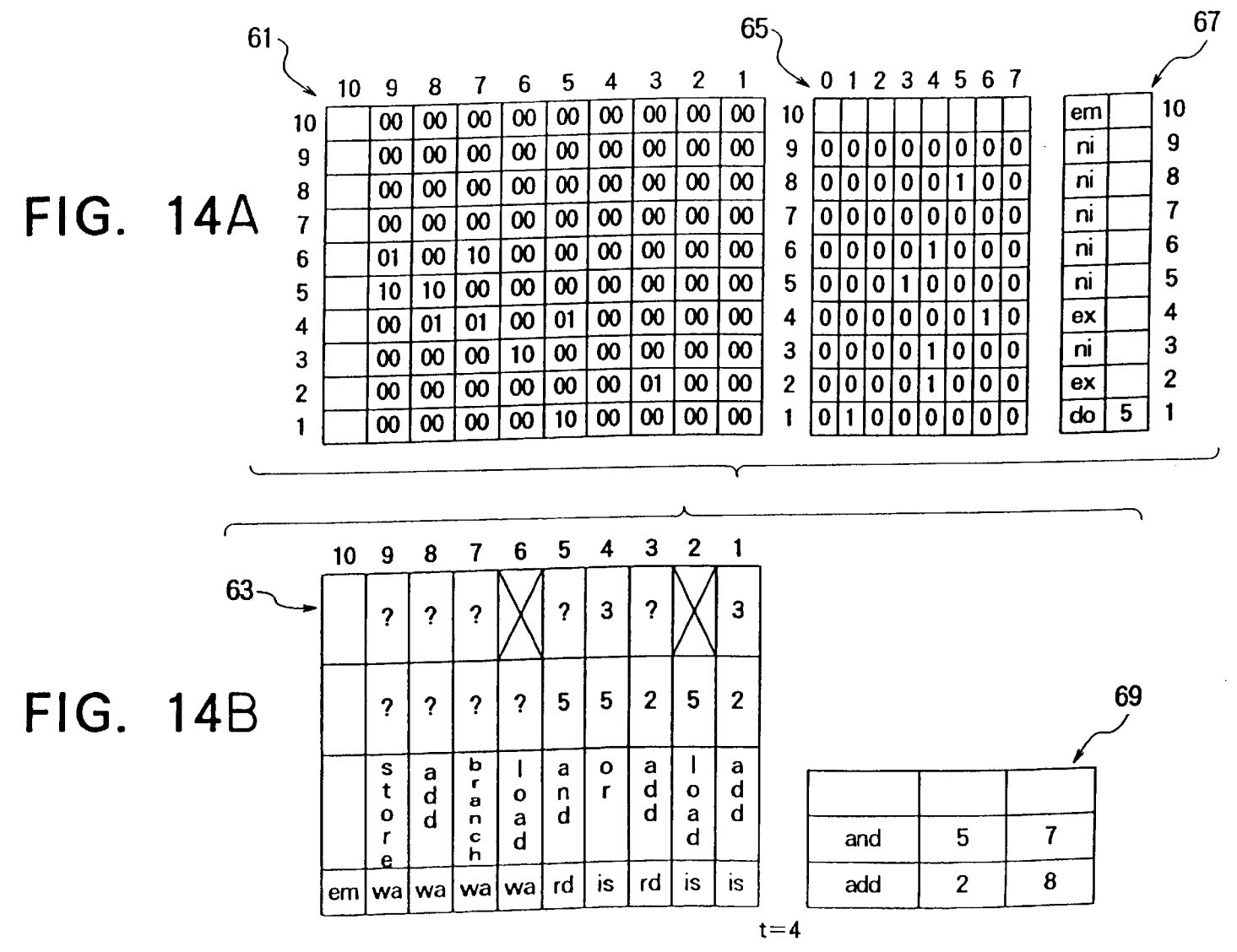

In FIG. 14 where t=4, the first and the second instructions proceed to the "WB" and the "EX2" stages. The third instruction remains in the "DP" stage for a third time. The fourth instruction proceeds to the "EX2" stage with its issue and execution flags turned to the "is" and the "ex" states. The fifth and the sixth instructions remain in the "DP" stage of the second time. The seventh to the ninth instructions are put into the "DP" stage in which the forward map is renewed at the forward bit cells 83 of the seventh column and the fourth and the sixth rows in correspondence to the fourth and the sixth instructions which refresh the registers r4 and r6, respectively, most recently. Likewise, the forward bit cells 83 are renewed in the eighth column and the fourth and the fifth rows and in the ninth column and the fifth and the sixth rows.

By the execution completing operation of the first instruction, the result of addition-by the first arithmetic unit 47(1) in response to the first instruction at this instant is stored in the result value buffer 67 with its execution flag switched to the "do" state and is forwarded to and stored by the operand forward operation in the laevooperand area 79(3) of the fifth column. By the operand forwarding reservation operation for the second and the fourth instructions, it turns out clear in the operand bypassing operation to bypass their results as the dextrooperands of the third and the fifth instructions. With the issue flags consequently turned both to the "rd" state, the third and the fifth instructions are dispatched into the instruction issue buffer 69 with their dextrooperands stored by this operand bypassing operation. For each of the seventh and the ninth instructions, the issue flag is put in the "wa" state.

Figures 15A, 15B:
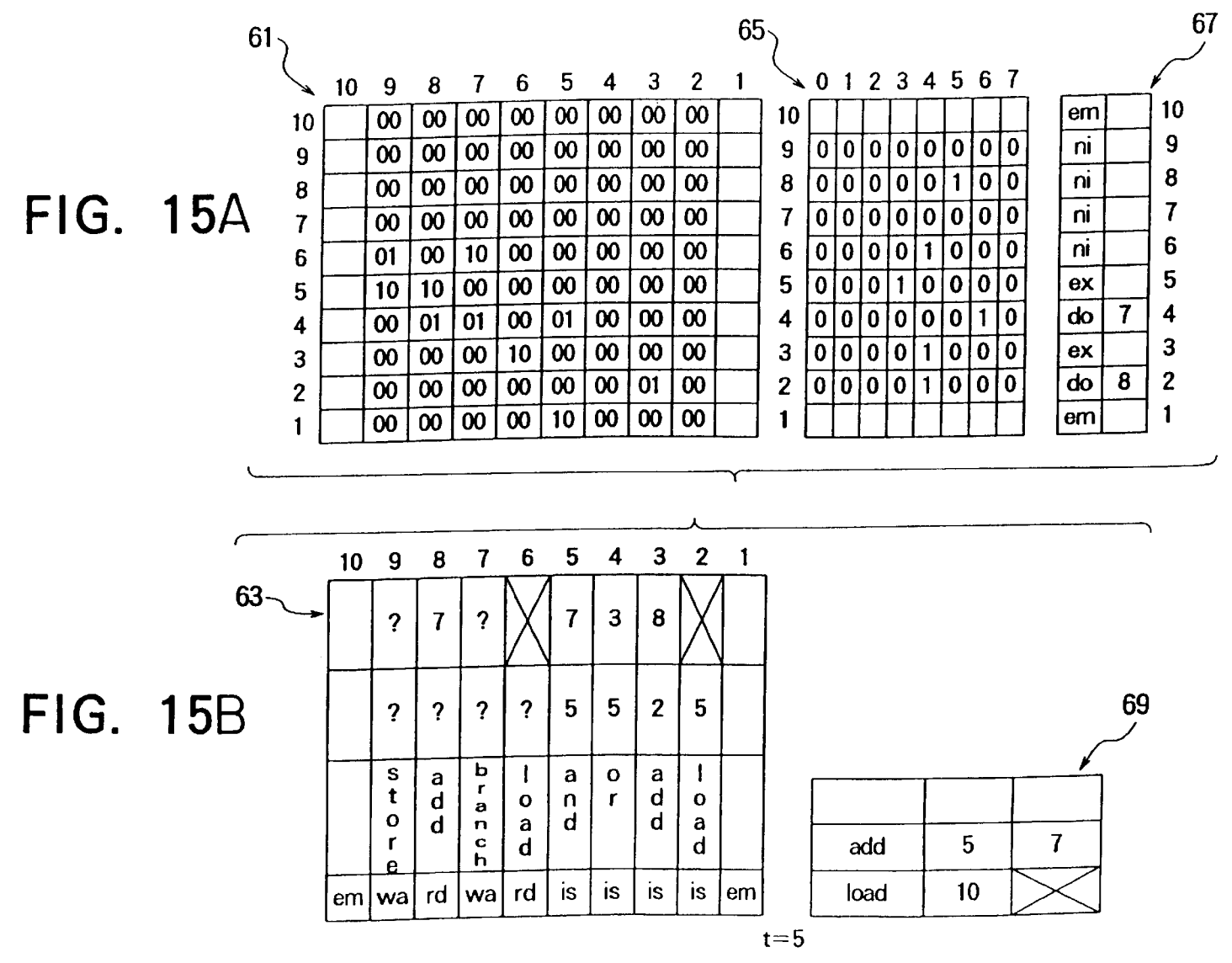

In FIG. 15 where t=5, the first instruction entirely disappears from the instruction store buffer 63 with the issue and the execution flags switches both in the first instruction information entry unit 91 to the "em" state. The second and the third instructions proceed respectively to the "WB" stage with the execution flag turned into the NdoN state and with the result of the second instruction stored in the result value buffer 67 and to the "EX2" stage with the issue and the execution flags switched into the "is" and the "ex" states and the result of the second instruction transferred from the result value buffer 63 to the instruction store buffer 63.

The fourth and the fifth instructions proceed to the "WB" and the "EX2" stages. The data are changed for the fourth instruction in the instruction store buffer 63 and in the result value buffer 67 like those described in connection with the second and the third instructions. The sixth instruction is in the "DP" stage of the third time. The seventh to the ninth instructions are all in the "DP" stage of the second time. Inasmuch as the operand forwarding reservation operation for the third and the sixth instructions puts the issue flags of the sixth and the eighth instructions back to the "rd" state, the sixth and the eighth instructions are dispatched into the instruction issue buffer 69. The results of the third and the fifth instructions are subjected to the operand bypassing operation to be used in the instruction issue buffer 69 as the laevooperands.

Figures 16A, 16B:
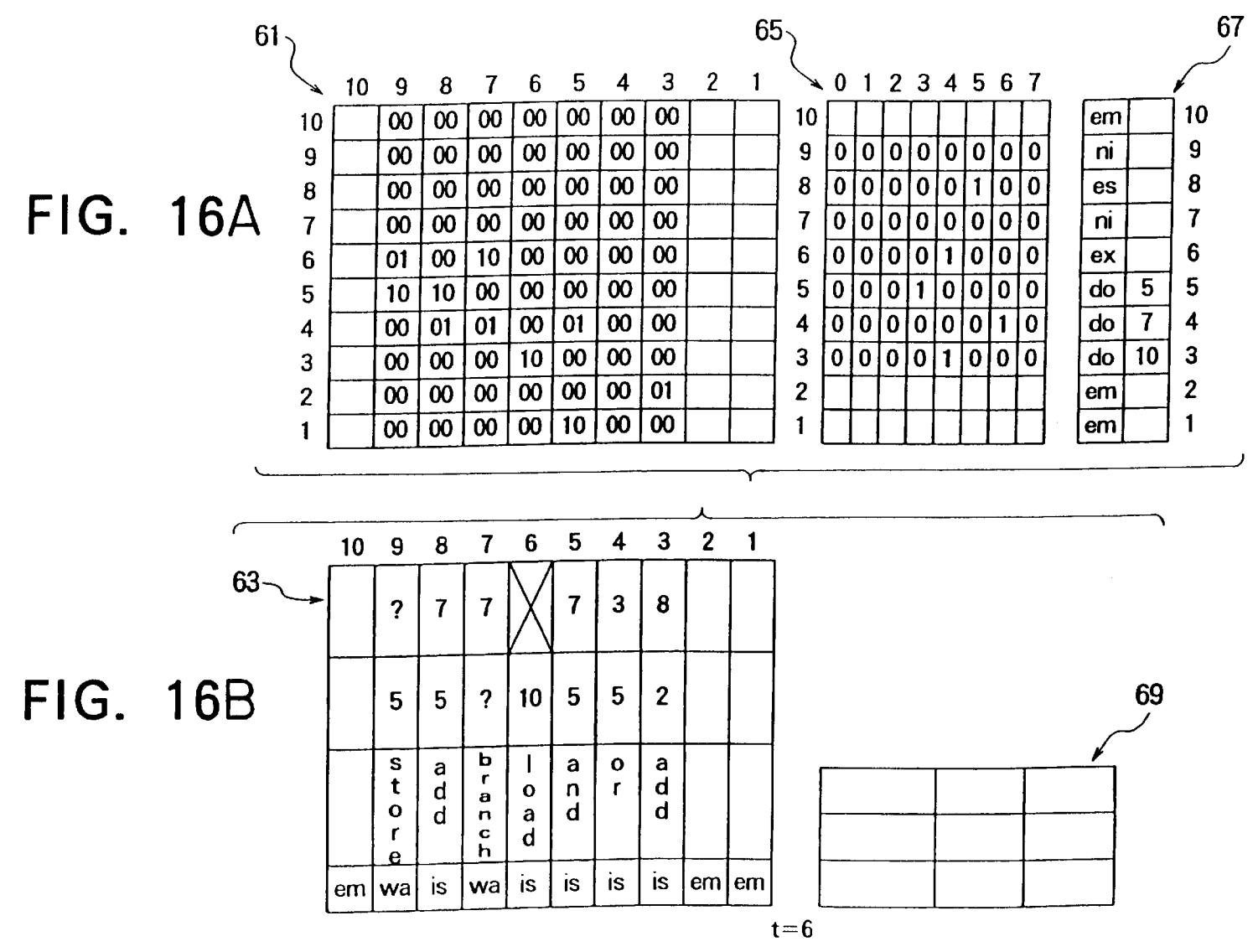

In FIG. 16 where t=6, the second instruction disappears from the instruction information unit 91. The results of the third and the fifth instructions are stored in the result value buffer 63. For use by the sixth instruction as its laevooperand according to the forward map, the result of the third instruction is stored also in the instruction store buffer 61. For use by the eighth and the ninth instructions as their laevooperands, the result of the fifth instruction is stored in the instruction store buffer 63. For use by the seventh instruction as its dextooperand, the result of the fourth instruction is now transferred to the instruction store buffer 63. In the cycle being illustrated, the eighth instruction begins its execution. It should, however, be noted in this connection that the seventh instruction of branch is not yet executed. The eighth instruction is therefore in the state of speculation with its execution flag put in the "es" state. More specifically, the eighth instruction is executed with a presumption such that the branch fails.

Figures 17A, 17B:
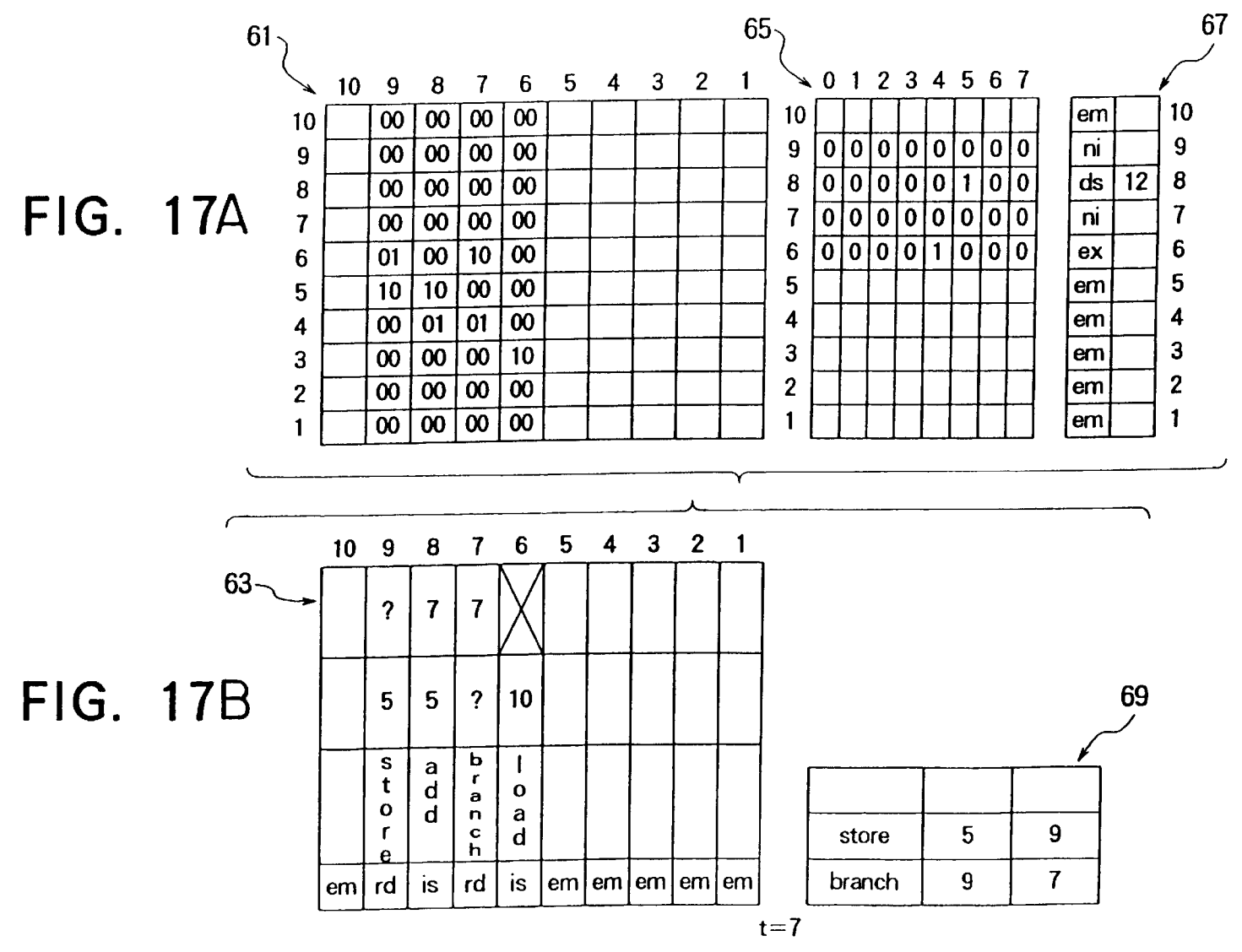

In FIG. 17 where t=7, the third through the fifth instructions disappear from the instruction information entry unit 91. Incidentally, the fourth instruction remains as the preconfirmed instruction until this cycle because its execution becomes confirmed when or after the third instruction is confirmed. Execution of the eighth instruction comes to an end with this execution left in the state of speculation and with its result stored in the result value buffer 67 to turn the execution flag into the "do" state. By the operand forwarding reservation operation of the sixth instruction, the issue flag is switched to the "rd" state for the seventh and the ninth instructions. As a consequence, the seventh and the ninth instructions are dispatched into the instruction issue buffer 69. The operand bypassing operation of the sixth instruction bypasses its result as the laevooperand of the seventh instruction and as the dextrooperand of the ninth instruction to the instruction issue buffer 69.

Figures 18A, 18B:
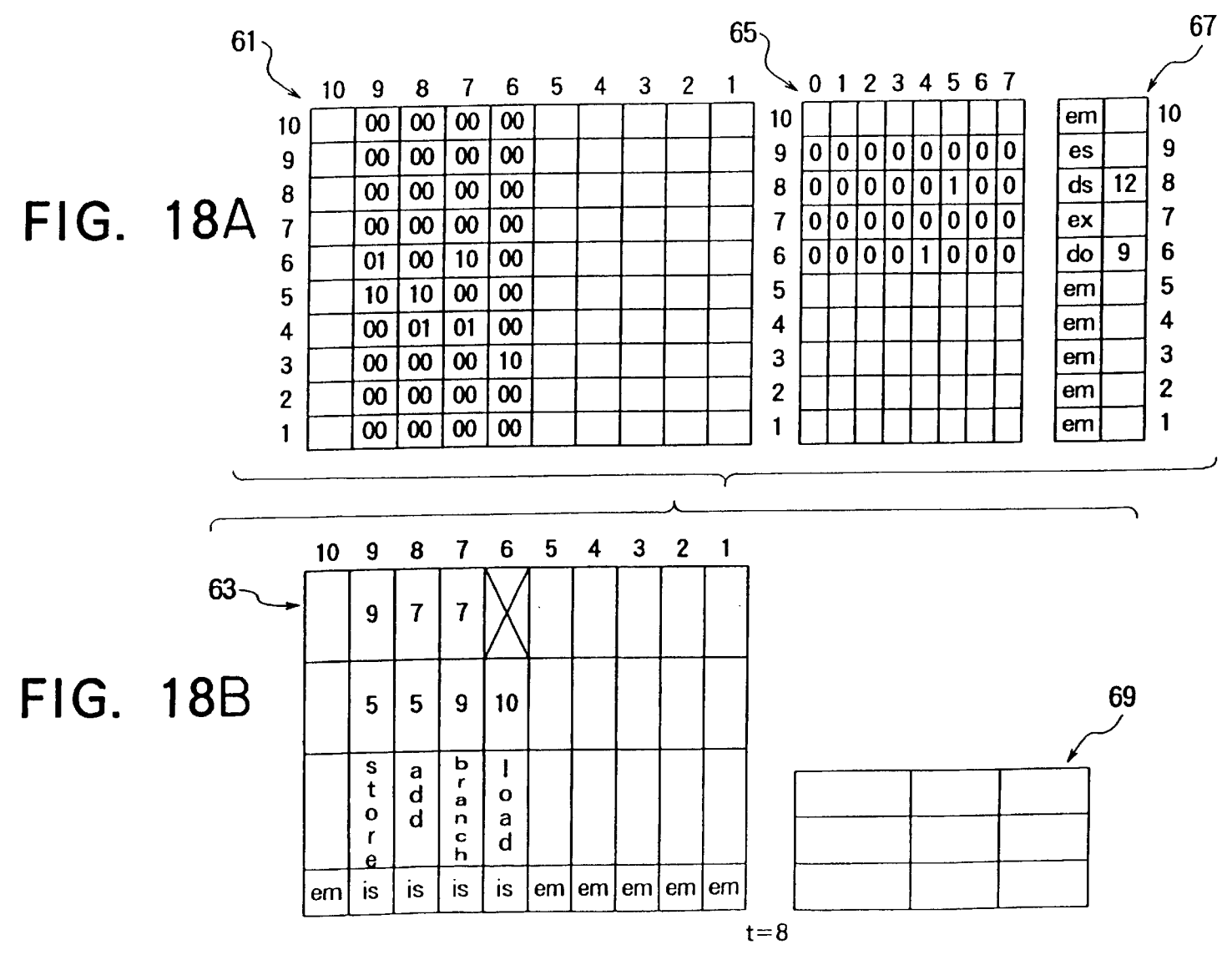

In FIG. 18 where t=8, the sixth instruction proceeds to the execution completing operation in the "WB" stage. Its result is stored in the result value buffer 67 with the execution flag switched to the "do" state. Their result is stored in the instruction store buffer 63 for the seventh and the ninth instructions. The seventh instruction is the "EX2" stage. Its execution flag is therefore switched to the "ex" state. In contrast, the ninth instruction is still under execution in the "EX1" stage because execution of the seventh instruction is in progress. In other words, the ninth instruction is in the executing on speculation state. Its execution flag is consequently put to indicate the "es" state.

Figures 19A, 19B:
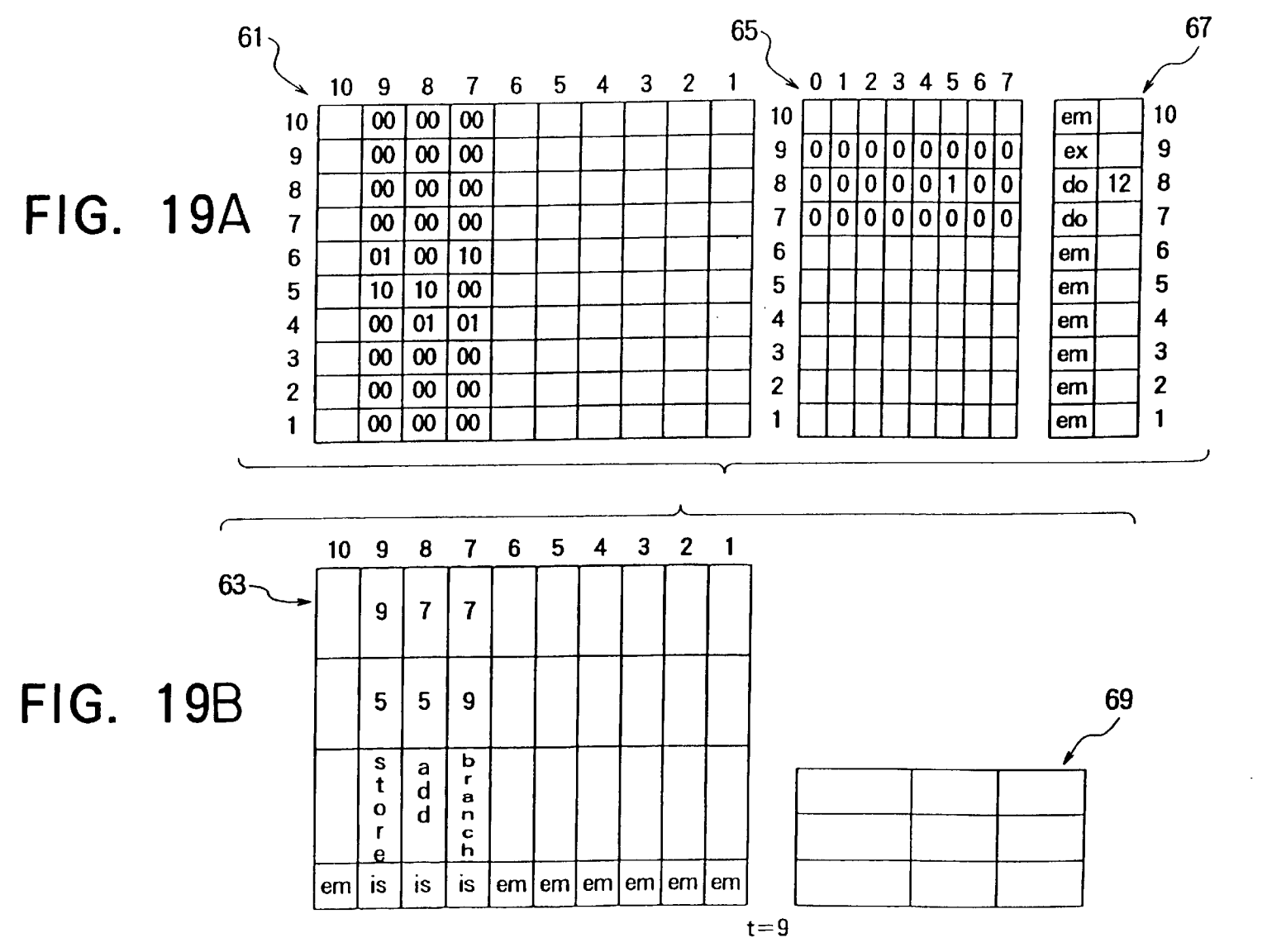

In FIG. 19 where t=9, the instruction information disappears from the instruction information entry unit 91 in connection with the sixth instruction. The seventh instruction proceeds to the instruction completing operation in the "WB" stage. Its execution flag is turned into the "do" state. The eighth and the ninth instructions are released from the state of speculation. Their execution flags are therefore made to indicate the "do" and the "ex" states. Incidentally, it turns out that execution of the sixth instruction is confirmed.

In FIG. 20 where t=10, execution of the seventh and the eighth instruction is already confirmed. The ninth instruction proceeds to the "WB" stage in which the execution flag is switched to the "do" state.

Reviewing FIGS. 11 to 20, the forward map buffer 61 and the register map buffer 63 are operable to specify the data dependency between the instructions on the register file 37 of FIG. 1. These buffers 61 and 63 are very useful on forwarding the results of a certain one of the instructions as the operand or the operands of another of the instructions.

Figure 21:
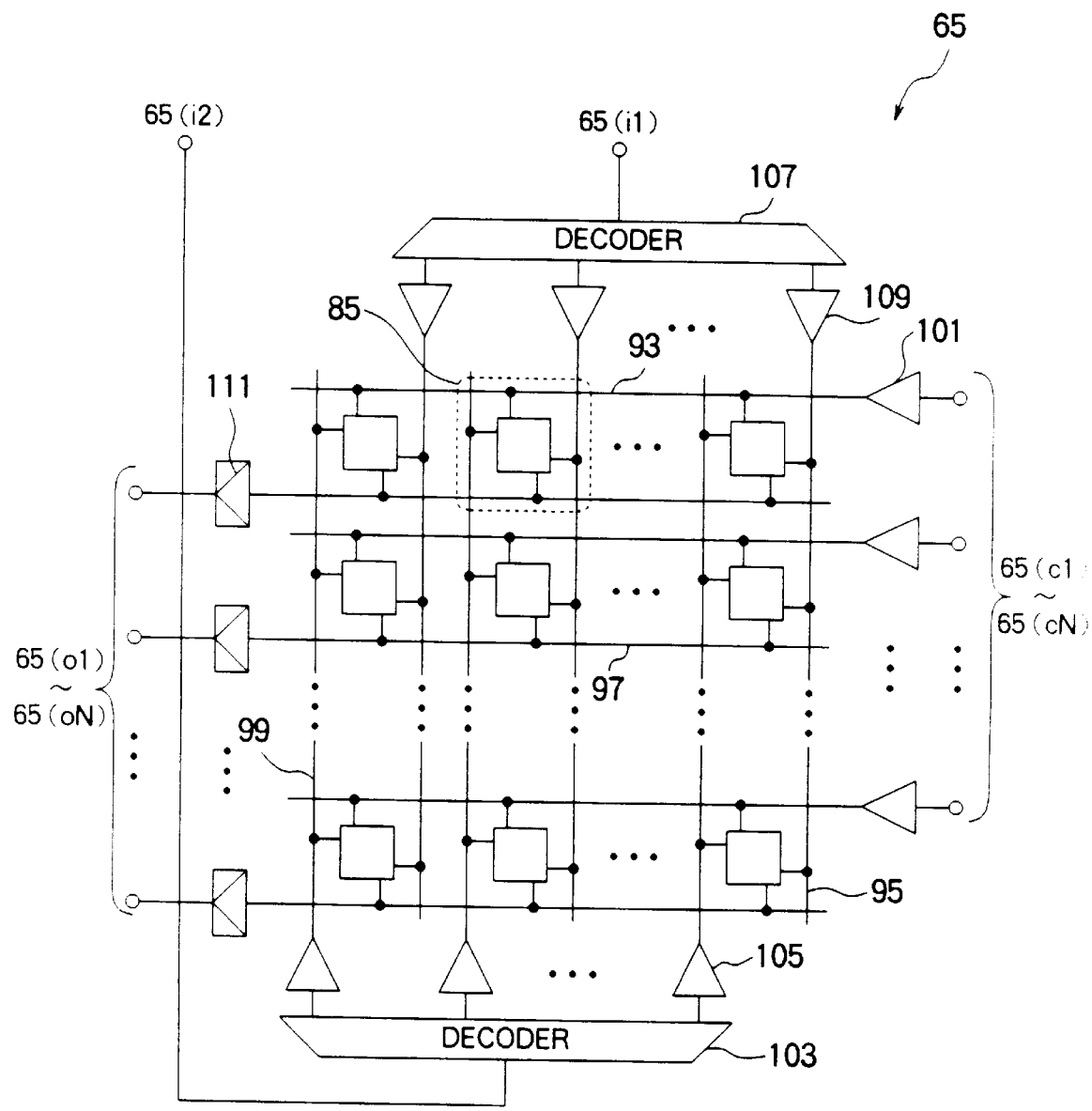
FIG. 21 is a block diagram of a register map buffer which is used in the instruction parallel issue and execution administrating device illustrated in FIGS. 4 and 5.

Referring now to FIG. 21 and additionally to FIGS. 1, 4, and 5, the register map buffer 65 will be described in greater detail as regards its operation of storing register write-in information in one alone of the instruction as an n(61)-th part of the first to the N-th instruction information entry units 91 as an n(61)-th stored part and its operation of detecting the n(61)-th stored part as an n(61)-th detected part. Here, the reference numeral 61 is used as a suffix to the letter n with this reference numeral enclosed with parentheses. These storing and detecting operations are carried out in the instruction store and the operand fetch operations described in conjunction with FIG. 7.

In FIG. 21, it will be presumed that a plurality of memory cells are arranged as an orthogonal memory of first to M-th columns and first to N-th rows, where the memory cells are the register bit cells 85 and are therefore designated by this reference numeral, M representing the number of the registers 39 and N representing the ordinal numbers of the instructions. The memory cells 85 are connected to first to M-th row-wise word lines 93, first to N-th columnwise word lines 95, first to M-th row-wise bit lines 97, and first to N-th columnwise bit lines 99.

It should be noted that only one line is depicted along each column and each row. This is because it is surmised that the operations are described in connection with one alone of the instructions. In practice, a plurality of word lines, L in number, are necessary when L instructions, such as three instructions, are concurrently fetched and decoded. The bit lines 97 and 99 must be 2L in number along each column and each row.

In FIG. 21, it will be assumed that a datum is written in the register 39 of the register number r by the n-th instruction during the instruction store operation described in conjunction with FIG. 7. In this case, the instruction execution control unit 71 sends a binary one signal to the n-th one alone of the register map control terminals 65(c1) to 65(cN) and binary zero signals to other register map control terminals. Responsive to these binary one and zero signals, first to N-th row drivers 101 drive the memory cells 85 of an n-th row to put these memory cells 85 in a writable state. On the other hand, the n-th instruction is supplied through the write register indication terminal 65(i2) to a write-in decoder 103 which delivers a binary one signal to an r-th one alone of the columnwise bit lines 99 and binary zero signals to other columnwise bit lines through first to M-th write-in circuits 105. As a consequence, the binary one signal or bit is stored only in the memory cell 85 at the r-th column n-th row in the manner described before in connection with FIG. 5.

It will next be assumed that the above-mentioned binary one signal or bit should be read out in the operand fetch operation. In this latter case, an n-th instruction indicative of the register 39 of the register number r is delivered through the read register indication terminal 65(i1) to a read-out decoder 107 which supplies a binary one signal to an n-th one alone of the columnwise word lines 95 and binary zero signals to other columnwise word lines through first to M-th column drivers 109. As a result, the memory cells 85 of the n-th column supply their contents to the first to the N-th row-wise bit lines 97. Connected to these bit lines 97, first to N-th read-out circuits 111 deliver results of read out of the register map buffer 65 as the binary one and zero signals through the first to the N-th register write detection terminals 65($o$1) to 65($o$N) to the operand forwarding control unit 73.

Figure 22:
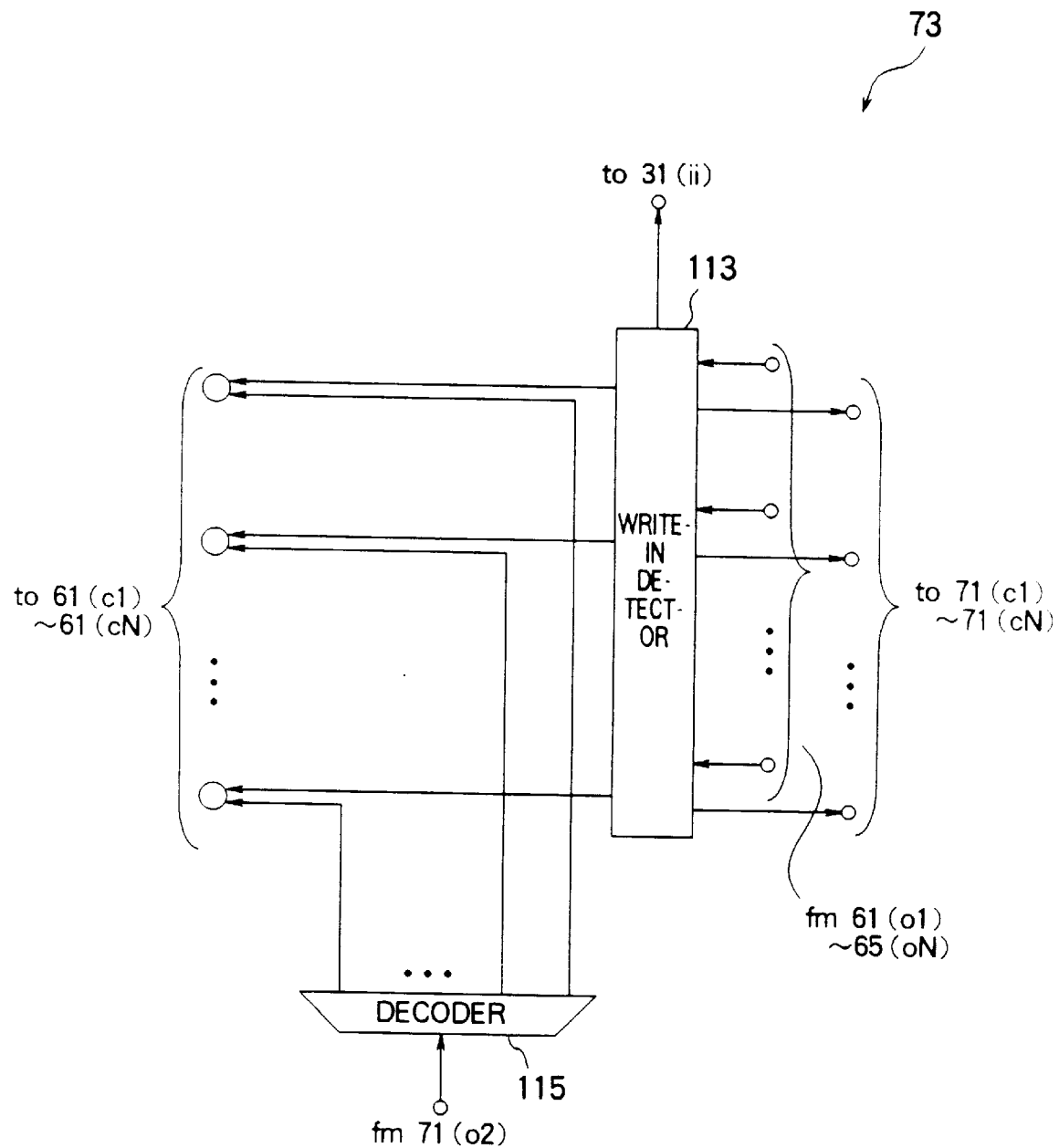
FIG. 22 is a block diagram of an operand forwarding control unit for use in the instruction parallel issue and execution administrating device depicted in FIGS. 4 and 5.

Turning to FIG. 22 with FIGS. 1, 4, and 5 additionally referred to, the operand forwarding control unit 73 comprises a newest write-in detector 113 which is connected to the register file read control terminal 31(ii) and supplied from the register map buffer 65 with the binary one and zero bits through the first to the N-th register write detection terminals 65($o$1) to 65($o$N) to deliver a preconfirmed result request signal to the result value buffer 67 through one each of the instruction execution control terminals 71($c$1) to 71($c$N) and the result buffer input terminals 67($i$1) to 67($i$N) and moreover a forward map renewal and read indication signal to the forward map buffer 61 through one of the forward map control terminals 61($c$1) to 61($c$N). Connected to the second instruction execution output terminal 71($o$2), a decoder 115 delivers a decoder output signal to the above-mentioned one of the forward map control terminals 61($c$1) to 61($c$N).

During the operand fetch operation described in conjunction with FIG. 7, the register map buffer 65 transfers its content through the register write detection terminals 65($o$1) to 65($o$N) to the newest write-in decoder 113 for detecting whether or not the contents include the binary one bit. If no binary one bit is included, the contents are transferred through the register file read control terminals 31(ii) to all registers 39. Meanwhile, the newest write-in decoder 113 searches for the above-described effective register bit entry 87($e$). More in detail, it will be assumed that a plurality of binary one bits are found in the contents. In this event, the newest write-in decoder 113 selects one of the binary one bits that is supplied from the memory cell 85 (FIG. 21) of the register numbers r for a latest or newest datum. The newest write-in decoder 113 uses only this one of the binary one bits and changes other binary one bits to the binary zero bits. So processed, the decoder output signal is delivered through the forward map control terminals 61($c$1) to 61($c$N) to the forward map buffer 61 to indicate the effective register bit entry 87($e$) for use in renewing the forward map.

In the operand forwarding operation described in connection with FIG. 7, the instruction execution control unit 71 sends through the second instruction execution output terminal 71($o$2) to the decoder 115 the ordinal number of one of the first to the N-th instructions that is in the "EX2" stage described in conjunction with FIGS. 6 to 8. Sending this ordinal number to a corresponding one of the forward map control terminals 61($c$1) to 61($c$N), the decoder 115 indicates one of the forward source entry units 83(1) in the forward map that should be read out.

Figure 23:
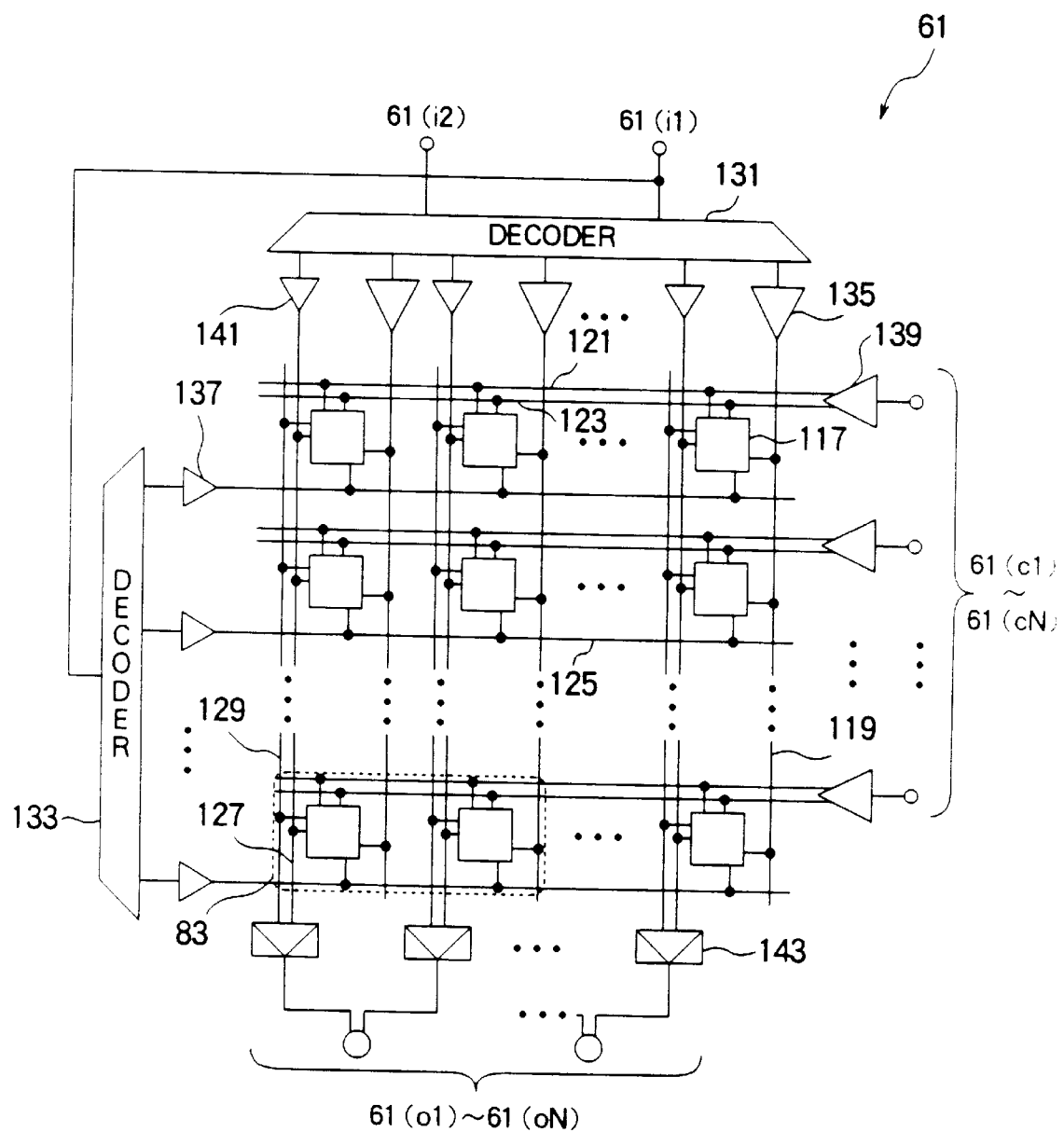
FIG. 23 is a block diagram of a forward map buffer for use in the instruction parallel issue and execution administrating device depicted in FIG. 4.

Referring now to FIG. 23 and also to FIGS. 1, 4, and 5, the forward map buffer 61 is exemplified, like the register map buffer 65 illustrated with reference to FIG. 21, as regards storage and renewal of the forward map for only one operand and read out of the forward map for only one result value. Incidentally, the storage, the renewal, and the read out are carried out by the instruction store, the operand fetch, and the operand forwarding reservation operations described in conjunction with FIG. 7.

For the two bits used in each of the forward bit cells 83 described in connection with FIG. 5, the forward map buffer 61 comprises a plurality of memory cells 117 in first, . . . , (2n-1)-th, 2n-th, . . . , and 2N-th columns and in first, . . . , n-th, . . . , and N-th rows. The memory cells 117 of an n-th column and the first to the N-th rows are connected in common to an n-th columnwise word line 119. The first to the 2N-th column the n-th row memory cells 117 are all connected to n-th primary and secondary row-wise word lines 121 and 123 and to an n-th row-wise bit line 125. The n-th column the first to the N-th row memory cells 117 are all connected to n-th write-in and read-out columnwise bit lines 127 and 129.

It should be noted similar to FIG. 21 that each of the columnwise word line 119, the odd-numbered and the even-numbered row-wise word lines 121 and 123, the row-wise bit line 125, and the read-out and the write-in columnwise bit lines 127 and 129 should be in practice a plurality of lines. It will be surmised that the L instructions are simultaneously fetched and decoded as before and that an up to a prescribed number K of instructions are executed to their ends. Under the circumstances, the forward map buffer 61 should comprise L columnwise word lines 119, 2L odd-numbered row-wise word lines 121, K even-numbered row-wise word lines 123, L row-wise bit lines 125, K read-out columnwise bit lines 127 and 2L write-in columnwise bit lines 129.

On describing the instruction store operation as regards the forward map buffer 61, it will be surmised that affecting and affected instructions are two of the L concurrently fetched and decoded instructions to serve as forward source and destination, respectively, and have the dependency in the register file 37 such that first and second result values of the affecting instruction decide the laevooperand and the dextrooperand of the affected instruction. The affecting and the affected instructions are simultaneously supplied through the forward map store terminal 63($i$1) to first and second decoders 131 and 133. In compliance with one of the registers 39 that should deliver the laevooperand primarily to the instruction store buffer 63, the first decoder 131 supplies through columnwise word line drivers 135 a binary one signal and binary zero signals to a first one and others connected among the columnwise word lines 119 to odd-numbered ones of the memory cells 117 that is indicated by the ordinal number of the affected instruction. Similarly, the binary one signal and the binary zero signals are supplied to a second one and others paired among the columnwise word lines 119 with the first one and the above-mentioned others if another of the registers 39 should produce the dextrooperand for the affected instruction. In this manner, columnwise aligned ones of the memory cells 117, such as the 2(n-1)-th column and/or the 2n-th column the first to the N-th row memory cells 117, are put in a writable state. Such a binary one signal therefore serves as a write enable signal. Responsive to the affecting instruction, the second decoder 133 supplies a binary one signal and binary zero signals through row write-in circuits 137 to one and others of the row-wise bit lines 125 that corresponds to the ordinal number of the affecting instruction. As a consequence, either only one or both of the binary bits are stored in the forward bit cell or cells 83 in the manner described in conjunction with FIG. 5. Incidentally, each of the affecting and the affected instructions will be called a preceding instruction for convenience of the following with another of the N instructions referred to as a succeeding instruction.

During the operand fetch operation, one of the forward map control terminals 61($c$1) to 61($c$N) is supplied from the newest write-in detector 113 (FIG. 22) with the forward map renewal and read indication signal in response to the succeeding instruction. Connected to this one of the forward map control terminals 61(c1) to 61(cN), one of a plurality of row-wise word line drivers 139, which are connected to the primary and the secondary row-wise word lines 121 and 123, delivers a binary one signal to one of the primary row-wise word lines 121 that is connected to this one of the row-wise word line drivers 139. Others of the row-wise word line drivers 139 deliver binary zero signals to remaining ones of the primary row-wise word lines 121. In due course, the forward map renewal control terminal 61(i2) is supplied with the succeeding instruction indicative of one of the registers 39 in which the datum should be renewed. In response, the first decoder 131 delivers through column write-in circuits 141 a binary one signal and binary x signals to the columnwise write-in lines 127, where each binary x signal does not partake write-in as by leaving the write-in line electrically floating. As a result, the binary bit is rewritten to the binary one bit in each of the odd-numbered and the even-numbered memory cells 117 supplied with the binary one signals through one of the primary row-wise word lines 121 and one of the column write-in lines that are connected to the odd-numbered and/or the even-numbered memory cell 117 under consideration.

In the operand forwarding reservation operation, one of the forward map control terminals 61(c1) to 61(cN) is supplied from the decoder 115 of the operand forwarding control unit 73 with the preconfirmed result signal. Connected to this one of the forward map control terminals 61(c1) to 61(cN), one alone of the row-wise line drivers 139 delivers a binary one signal to one of the secondary row-wise word lines 123 that is connected together with a paired one of the primary row-wise word lines 121 to this one of the row-wise line drivers 139. Others of the row-wise line drivers 139 deliver binary zero signals to remaining ones of the secondary row-wise word lines 123. Driven by the binary one signal, the odd-numbered and the even-numbered memory cells 117 of a pertinent row, namely, a pertinent forward source entry unit 83(1), deliver the binary one and zero bits to the first, . . . , the (2n-1)-th, the 2n-th, . . . , and the 2N-th read-out columnwise bit lines 129.

The (2n-1)-th and the 2n-th read-out column bit lines 129 are connected through an n-th read-out circuit 143 to the n-th one of the forward map output terminals 61(o1) to 61(oN). It may be mentioned here with reference to FIGS. 7 and 8 that the operand fetch and the operand forwarding reservation operations are simultaneously carried out for first and second succeeding instructions. In this event, the first decoder 131 supplies the binary one and zero signals to the write-in columnwise bit lines 127. Simultaneously, the binary one and zero bits are supplied as the binary one and zero signals to the read-out columnwise bit lines 129. The write-in and the read-out columnwise bit lines 127 and 129 are therefore connected to one of the read-out circuits 143 for producing a logic OR in this case.

Figure 24:
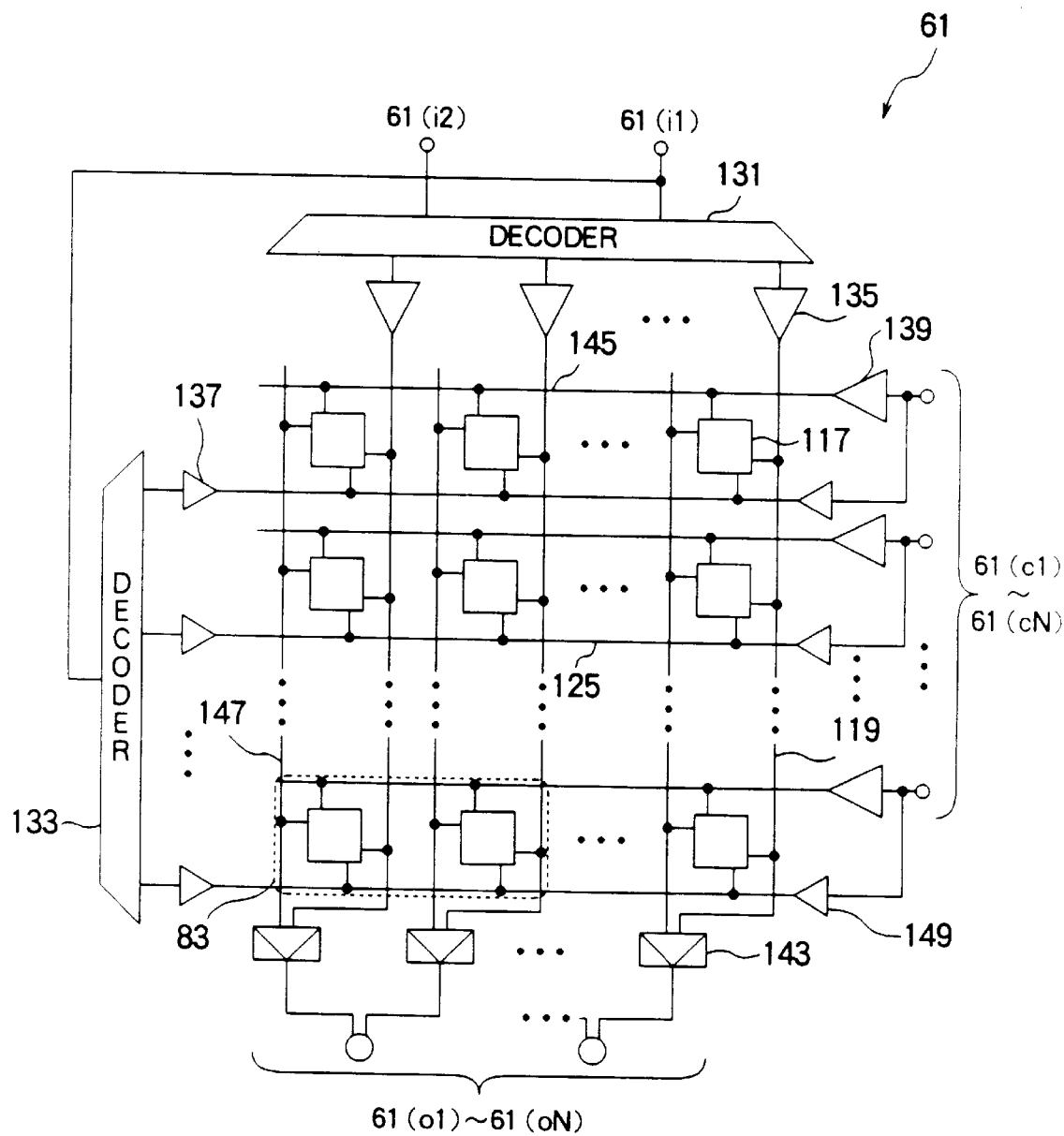
FIG. 24 is a block diagram of another forward map buffer for use in place of the forward map buffer depicted in FIG. 23.

Turning to FIG. 24 with FIGS. 1, 4, 5, and 23 continuously referred to, the forward map buffer 61 will be described as regards another example. A single row-wise word line 145 is substituted for each pair of the primary and the secondary row-wise word lines 121 and 123. A single columnwise bit line 147 is used in place of each pair of the write-in and the read-out columnwise bit lines 127 and 129 to serve for both write-in and read-out of the two binary bits in each forward bit cell 83. In other words, only one set of the columnwise word line 119 and the single columnwise bit line 147 is used for each memory cell 117. Consequently, the column write-in circuit 141 are not used. Each read-out circuit 143 is connected to the above-mentioned set of the columnwise word line 119 and the columnwise bit line 147. Instead, a plurality of control write-in circuits 149 are used between the forward map control terminals 61(c1) to 61(cN) and the row-wise bit lines 125 with the before-described row write-in circuits referred to afresh as input write-in circuits 137.

In the instruction fetch operation, the affecting instruction is supplied through the forward map store terminal 61(i1) to the first and the second decoders 131 and 133. Responsive to indication of two of the registers 39 for the laevooperand and the dextrooperand, the first decoder 131 sends through the columnwise word line drivers 135 a binary one signal and binary zero signals to two and others of the columnwise word lines 119. This puts one of the forward destination entry units 83(2) in the writable state. Meanwhile, the second decoder 133 responds to the affecting instruction to send through the input write-in circuits 137 a binary one signal and binary zero signals to one and others of the row-wise bit lines 125. As a consequence, a pair of the binary bits are stored in that one of the forward destination entry units 83(2) like in FIG. 23.

In the operand fetch operation, the newest write-in detector 113 (FIG. 22) delivers the preconfirmed result request signal to the forward map control terminals 61(c1) to 61(cN). Connected to the forward map control terminals 61(c1) to 61(cN), respectively, the control write-in circuits 149 deliver a binary one signal and the binary x signals to one and others of the row-wise bit lines 125. In due course, the forward map renewal control terminal 61(i2) is supplied with the succeeding instruction as in FIG. 23. In response, the first decoder 131 delivers through the columnwise word line drivers 135 a binary one signal and binary zero signals to two and others of the columnwise word lines 119. In this manner, the binary zero bit is renewed to the binary one bit only in the forward bit cell 83 indicated by the binary one signals.

In the operand forwarding reservation operation, the decoder 115 (FIG. 22) delivers the preconfirmed result signal to the forward map control terminals 61(c1) to 61(cN). Responsive to this preconfirmed result signal, the row-wise word line drivers 139 sends a binary one signal and binary zero signals to one and others of the row-wise word lines 147 to specify one alone of the forward source entry units 83(1). This one forward source unit 83(1) is thereby made to deliver the binary one and zero bits to the columnwise bit lines 149 and thence through the read-out circuits 143 to the forward map output terminals 61(o1) to 61(oN).

Like in FIG. 23, the columnwise word lines 119 should in practice be 2L in number. In practice, the row-wise bit lines 125 should be 2L in number. The row-wise word lines 145 should be K in number. The columnwise word lines 149 should be 2L in number.

In the manner described in conjunction with FIG. 23, the operand fetch and the operand forwarding reservation operations may simultaneously be processed. Furthermore, renewal and read out of the forward map may be requested in connection with a common row or forward source entry unit 83(1). Under the circumstances, the read-out circuits 143 receive the data for renewal directly from the columnwise word lines 119 and the binary bits of the forward map from the columnwise bit lines 147. Each read-out circuit 143 calculates a logic OR of the datum for renewal and the binary bits read out from each binary bit cell 83 to deliver the logic OR to one of the forward map output terminals 61(o1) to 61(oN) that is connected to the read-out circuit 143 in question.

Figure 25:
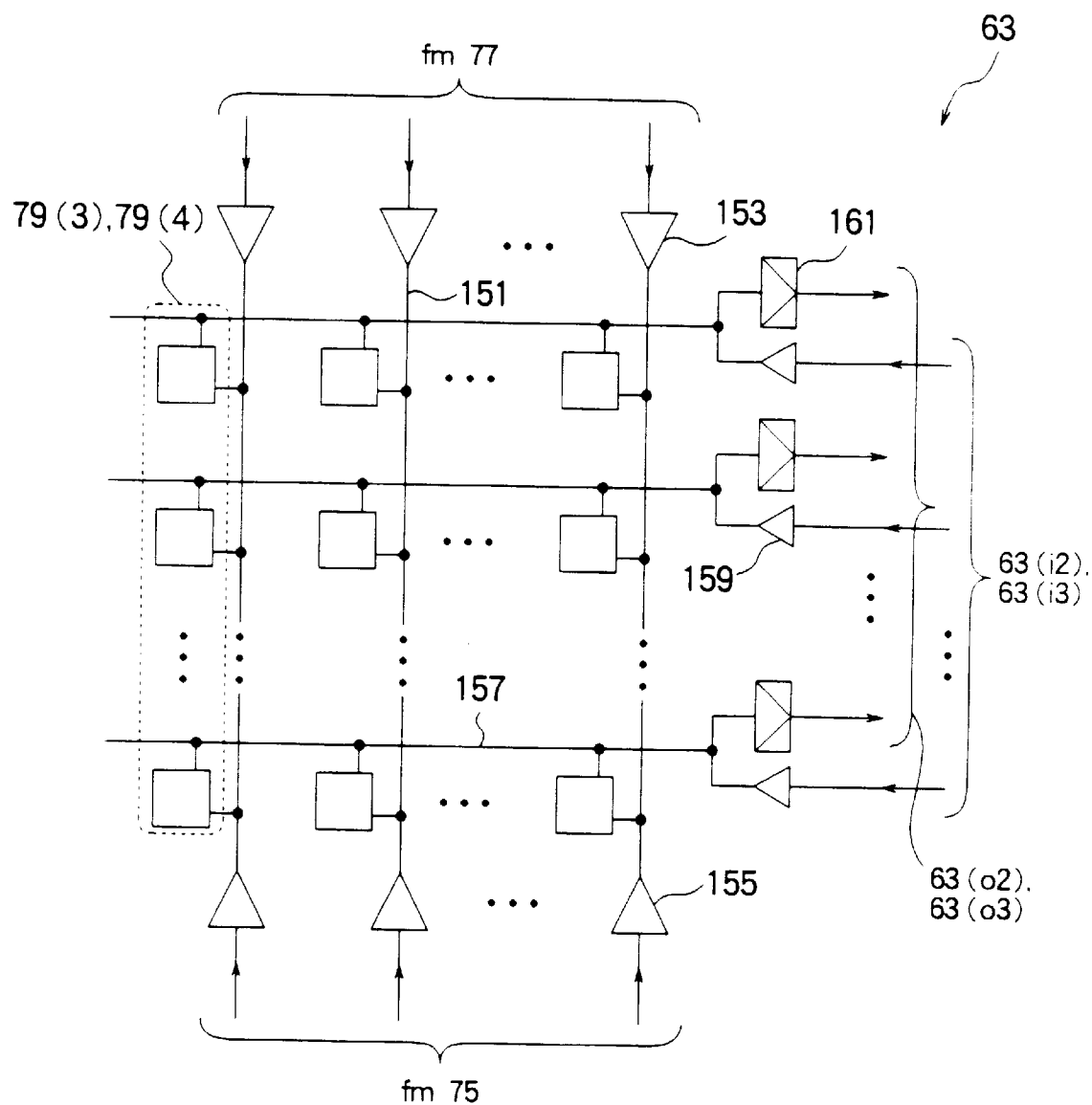
FIG. 25 is a block diagram of an instruction store buffer for use in the instruction parallel issue and execution administrating device depicted in FIGS. 4 and 5.

Referring to FIG. 25 and again to FIGS. 1, 4, and 5, the instruction store buffer 63 will be described as regards storage of the operands as stored operands in the operand forwarding operation and read-out of the stored operands in the instruction dispatch operation. This is because the operand fetch and the instruction dispatch operations are carried out, as described with reference to FIG. 7, both in the latter half of the "EX2" stage and are characteristic operations of the instruction parallel issue and execution administrating device 31. For the laevooperands and the dextrooperands which may be requested by the first to the N-th instructions stored in the instruction store buffer 63, the instruction store buffer 63 comprises a plurality of bit memory cells which are depicted by small squares and are arranged along each column for respective bits of each operand and along a row for the laevooperands and the dextrooperands of the first to the N-th instructions as indicated by a dotted-line rectangle for the laevooperand or the dextrooperand area 79(3) or 79(4). The instruction store buffer 63 further comprises a plurality of columnwise word lines 151 which are connected through primary word drivers 153 to the forward source entry buffer 77 and are connected through secondary word drivers 155 and through, in pairs, the instruction buffer control terminals 63(c1) to 63(cN) to the instruction issue control unit 75. The instruction store buffer 63 still further comprises a plurality of row-wise bit lines 157 connected by bit by bit of each of the laevooperand and the dextrooperand through bit write-in circuits 159 to one of the laevooperand and the dextrooperand input terminals 63(i2) and 63(i3) and through bit read-out circuits 161 to the laevooperand and the dextrooperand output terminals 63(o2) and 63(o3). The bit memory cells are connected to the word and the bit lines 151 and 157. In this manner, the instruction store buffer 63 need not be the orthogonal memory.

For the operand store operation, the forward source entry buffer 77 delivers the forward map of the forward source entry units 83(1) one by one to the primary word drivers 153. Generally speaking, a plurality of binary one bits are stored in each forward source entry unit 83(1). A corresponding number of word lines 151 are therefore driven by the binary one bits to a common binary one level. On the other hand, a preconfirmed result value is delivered through one of the laevooperand and the dextrooperand input terminals 63(i2) and 63(i3) to the bit write-in circuits 159. Bits of each operand are stored in the bit memory cells connected to those of the word lines 151 which are driven to the binary one level. In this manner, it is possible to store the preconfirmed result value simultaneously as the operands.

On reading out the operands to the laevooperand and the dextrooperand output terminals 62(o2) and 63(o3), the instruction issue control unit 75 specifies one of the first to the N-th instructions as a specified instruction. Responsive to the specified instruction, one of pairs of secondary word drivers 155 drives to the binary one level one pair of word lines 153 that is assigned to the specified instruction and is connected to a pair of the laevooperand and the dextrooperand areas 79(3) and 79(4). From the bit memory cells of this pair of the laevooperand and the dextrooperand areas 79(3) and 79(4), the bits of the laevooperand and the dextrooperand are delivered through the bit read-out circuits 161 to the laevooperand and the dextrooperand output terminals 63(o2) and 63(o3).

In other respects, it is believed that the instruction store buffer 63 is clear from the above and from the description which will presently follow. The issue flag areas 79(1) and the instruction code areas 79(2) are therefore no more described.

Figure 26:
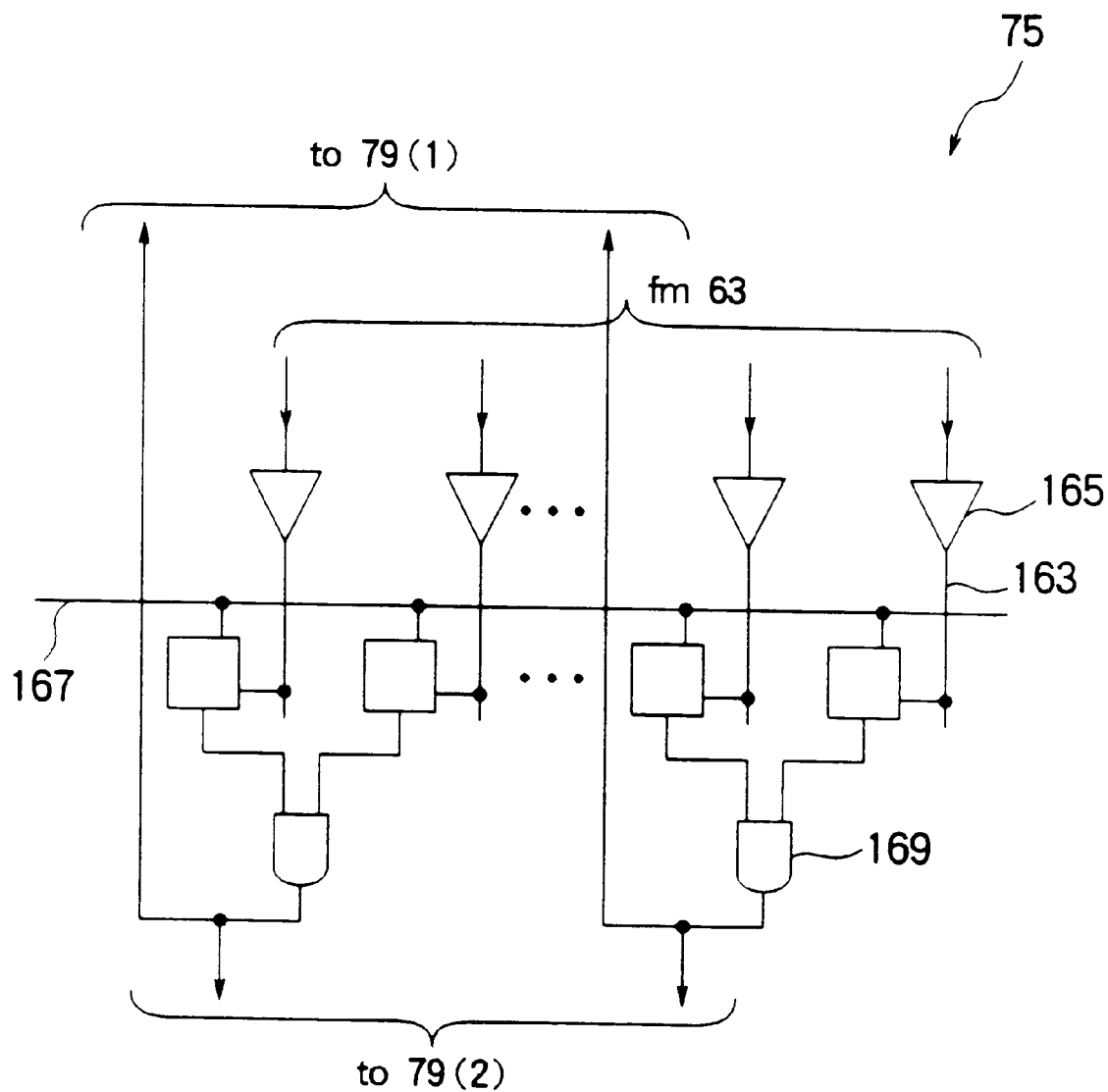
FIG. 26 is a block diagram of an instruction issue control unit for use in the instruction parallel issue and execution administrating device depicted in FIGS. 4 and 5.

Referring to FIG. 26 and additionally to FIGS. 1, 4, 5, and 25, attention will be directed to the instruction issue control unit 75 and in particular to its operation of judging in the operand forwarding reservation operation whether or not the operand or operands are all ready for each of certain ones of the first to the N-th instructions so that it is possible for the instruction store buffer 63 to dispatch to the instruction issue buffer 69 through the code, the laevooperand, and the dextrooperand output terminals 63(o1) to 63(o3) one of these instructions as a dispatched instruction that has the instruction code stored as a stored code in the instruction code area 79(2) through the instruction input terminal 63(i1). Consequently, the instruction issue control unit 75 comprises in correspondence to the laevooperands and the dextrooperand areas 79(3) and 79(4) for the first to the N-th instructions a row of N pairs of laevooperand and dextrooperand memory cells which are herein referred to briefly as operand memory cells and are depicted by small squares. The operand memory cells of the pairs are connected to primary or laevooperand and secondary or dextrooperand columnwise word lines 163 which are in turn connected through word line drivers 165 and through the word lines 151 and the primary word drivers 153 to the forward map buffer 61. Furthermore, the operand memory cells of the pairs are connected to a row-wise word line 167 which is driven by a binary one signal whenever the pipeline stages for each instruction proceeds to the operand forwarding reservation operation.

During the operand forwarding operation, the forward map is transferred from the forward map buffer 61 through the instruction store buffer 63 to the instruction issue control unit 75. On so transferring the forward map, it may be mentioned here that the binary one and zero bits are stored and updated in the forward bit cells 83 in the manner exemplified in connection with FIGS. 11 to 20. When the binary one and zero bits are present in the columns of the forward bit cells 83, binary one bits are stored in the operand memory cells of those of the pairs which correspond to the last-mentioned columns. When the laevooperand alone is requested by one of the instructions, the binary one bit is preliminarily stored by a control circuit (not shown) of the instruction issue control unit 75 in the dextrooperand memory cell of one of the pairs that is assigned to this one of the instructions. The pairs of operand memory cells are connected to a plurality of AND gates 169, respectively. When the binary one bits are stored in the operand memory cells of one of the pairs, a corresponding one of the AND gates 169 turns the issue flag to the "rd" state through corresponding two of the secondary word drivers 155 in one of the issue flag areas 79(1) that is connected to the above-mentioned one of the AND gates 169. When the binary one and zero bits disappear from one of the forward bit cells 83 in the manner described in conjunction with FIGS. 15 to 20 upon completion of the "WB" stage for at least one of the instructions, the binary one bits are turned into binary zero bits in the operand memory cells of corresponding at least one pair. This switches through the AND gates 169 the issue flags and the execution flags back to the "em" state in at least one of the instruction information entry units 91 that corresponds to the above-mentioned at least one of the instructions. It is now understood that the operand memory cells are, in practice, bit memory cells.

Once more reviewing FIGS. 1, 4, and 5, it has been assumed that the instruction information remains in one of the instruction information entry units 91 after once stored therein in connection with one of the instructions until completion of the "WB" stage of this one of the instructions.

On so fixedly administrating the instruction information, the instruction parallel issue and execution administrating device 31 uses the instruction information entry units 91 cyclically. It therefore unavoidably occurs that the fetch order and the execution order are different from each other as pointed out in the outset of the description referring to FIG. 3. In other words, each of the forward map buffer 61, the instruction store buffer 63, the register map buffer 65, the result value buffer 67, and the instruction issue buffer 75 must be a known cyclic FIFO (first-in first-out memory). This applies to the instruction execution control unit 71 and to the newest write-in detector 113.

It is possible alternatively shift the instruction information in the instruction information entry units 91 when the "WB" stage comes to an end as regards one of the N instructions with a result such that the instruction information of this one of the N instructions disappears from one of the instruction information entry units 91. In this event, each of the forward map buffer 61, the instruction store buffer 63, the register map buffer 65, the result value buffer 67, and the instruction issue buffer 75 may be a FIFO of a known shift type. Furthermore in this event, the shift type FIFO need not comprise for use as the forward map buffer 61 its memory stages depicted in FIG. 5 at a triangle area above a diagonal line passing through the forward bit cells 83 of the tenth column tenth row and the first column first row, namely, where n(row) is not less than n(column) provided that the shift is towards the first column first row one of the forward bit cells 83.

It is now clear that the instruction parallel issue and execution device 31 comprises no comparators. This is because the forward map is established in the forward map buffer 61 prior to actual generation of a result value and consequently because it is no more necessary to use the comparators, such as 53(5), 53(6), 57(5), and 57(6), in parallel comparing the instruction tags with one another to test the dependency between the result of an instruction and at least one of the operands requested by another instruction.

No comparators are used in the register map buffer 65. This is because the bit map is used to indicate the ordinal numbers of the instructions and the register numbers as regards one of the registers 39 that should store the result of one of the instructions for use as the operand of another of the instructions in contrast to the prior art where the comparators are used in parallel comparing the instruction tags with respect to the instruction giving the result and the instruction which requires the result as its operand.

In the instruction parallel issue and execution administrating device 31, detection of the dependency between the result and the operand and forwarding of the result to the operand are carried out reactively or retroactively. This reactivity means waiting by the succeeding instruction for use as its operand for the result generated by the preceding instruction and actual use of the result as soon as it is generated. This is in contrast to the prior art where the comparators are inevitably used in comparing the register numbers as well as the instruction tags.

More particularly, the conventional instruction parallel issue and instruction parallel execution administrating devices deal with the detection and the use actively. This active administration means the facts that the preceding instruction knows later generation of its operand by execution of the preceding instruction and that the result is used as the result after the later generation. No comparators are therefore necessary in contrast to the reactive operation of the instruction parallel issue and execution administrating device 31.

While this invention has been described in specific conjunction with a preferred embodiment thereof with reference to FIGS. 1 and 4 to 26, it will now be readily possible for one skilled in the art to carry this invention into effect in various other manners. For example, it is possible to use comparators in the forward bit cells 83 and/or in the register bit cells 85 so as to provide a more simplified circuit structure and a more reduced circuit scale and to reduce the power consumption.

It is possible to divide the instruction store buffer 63 into a plurality of instruction buffer sections depending on the types or kinds of the instructions. The instructions may be dispatched from the instruction store buffer 63 to the instruction issue buffer 69 before each instruction is judged by the instruction issue control unit 75 whether or not the instruction in question is dispatchable. In this event, the instruction is tested as regards dispatchability after stored in the instruction issue buffer 69 with the issue flag areas 79(1) included in the instruction issue buffer 69.

It is furthermore possible to use in the forward map buffer 61 and/or the register map buffer 65 a pair of complementary bit lines in place of each bit line. This is desirable in view of an operation margin on supplying the binary x bit to each bit line. It is additionally possible to use a floating point device as each of the memory access unit 43 and the arithmetic-logic units 47(1) and 47(2) in the manner described in the Johnson book referred to hereinabove.

It is possible to say that the forward bit cells 83 are arranged in a two-dimensional array of first to P-thg rows corresponding to the first to the N-th rows to include a p-th row and of first to Q-th columns which correspond, when two of such columns are assumed to correspond to the n(column)-th row, respectively, and include a q-th column. Similarly, the register bit cells 85 are arranged in a two-dimensional matrix of first to R-th columns (corresponding) to the zeroth through the M-th columns, respectively, to include an r-th column and of the first to the P-th rows which are similar to those of the array. Incidentally, the forward map need not comprise an area where:

$$p/P + q/Q > 1.$$

What is claimed is:

1. A superscalar processor with an instruction parallel issue and execution administrating device issuing and executing a predetermined peak number of instructions in parallel, each of said instructions having at least one respective operand and producing a respective execution result, said device comprising:

a forward map buffer storing a forward map with entries including, for each one of said instructions:
respective source entries indicating the other ones of said instructions providing, as said respective execution result, said respective operand of said one of said instructions, and
respective destination entries indicating the other ones of said instructions using, as said respective operand, said respective execution result of said one of said instructions;
wherein said respective source entries are stored before said respective execution result of said one of said instructions is produced; and
wherein said destination entries are stored after said respective execution result of said one of said instructions is produced.

2. An instruction parallel issue and execution administrating device for use in a superscalar processor in issuing and executing a predetermined peak number of instructions in parallel, comprising a forward map buffer for storing a forward map indicating the use of results of the complete execution of each of said instructions as operands by the others of the instructions, the forward map being stored before actual production of the results and being used in identifying, when said execution of each of the instructions is complete, corresponding ones of the other instructions using as a respective operand the result indicated by said forward map;

wherein said result is one of first to P-th results, where P represents a first predetermined integer, said operand being one of first to Q operands, where Q represents a second predetermined integer, each of said first and said second predetermined integers being not less than said predetermined peak number, said forward map being composed of a plurality of forward one-bit data which are arranged in a two-dimensional array of first to Q-th columns and first to P-th rows and in which a q-th column p-th row forward one-bit datum is set at a first and a second predetermined value to indicate that a p-th result is and is not used as a q-th operand, respectively, where p represents one of 1 to P, q representing one of 1 to Q.

3. An instruction parallel issue and execution administrating device as claimed in claim 2, wherein said two-dimensional array has a rectangular outline comprising said first to said Q-th columns and said first to said P-th rows.

4. An instruction parallel issue and execution administrating device as claimed in claim 2, wherein said two-dimensional array has a trigonal outline comprising said first to said Q-th columns and said first to said P-th rows excluding a region where p/P plus q/Q is greater than 1.

5. An instruction parallel issue and execution administrating device as claimed in claim 4, wherein said predetermined value is given in said forward map to said q-th column p-th row forward one-bit datum before said actual production of said p-th result by said complete execution of a p-th instruction used as said each of the instructions when said q-th operand is identified for use by a q-th instruction which is executed later than said p-th instruction and is one of said others of the instructions.

6. An instruction parallel issue and execution administrating device as claimed in claim 5, wherein said forward map includes along a p-th column a q-th forward destination entry of up to a plurality of forward one-bit data which are equal in number to a least integer not greater than (P+1−(q+1)(P+1)/(Q+1)) and each of which indicates use of said p-th result as said q-th operand if set at said first predetermined value, said q-th forward destination entry being read from said forward map to produce said q-th operand when said q-th column p-th row forward one-bit datum is set at said first predetermined value and furthermore when said p-th result is actually produced and confirmed.

7. An instruction parallel issue and execution administrating device as claimed in claim 3, wherein said first predetermined value is given in said forward map to said q-th column p-th row forward one-bit datum before said actual production of said p-th result by said complete execution of a p-th instruction used as said each of the instructions when said q-th operand is identified for use by a q-th instruction which is executed later than said p-th instruction and is one of said others of the instructions.

8. An instruction parallel issue and execution administrating device as claimed in claim 7, wherein said forward map includes along a q-th column a q-th forward destination entry of up to Q forward one-bit data each of which indicates use of said p-th result as said q-th operand if set at said first predetermined value, said q-th forward destination being read from said forward map to produce said q-th operand when said q-th column p-th row forward one-bit datum is set at said first predetermined value and furthermore when said p-th result is actually produced and confirmed.

9. An instruction parallel issue and execution administrating device as claimed in claim 2, wherein said forward map buffer comprises a plurality of forward bit cells arranged in said two-dimensional array as an orthogonal memory with a q-th column p-th memory cell used for storage and read-out of said q-th column p-th row forward one-bit datum among said forward bit cells and connected to a plurality of forward map word lines running parallel to said q-th column and said p-th row and to a plurality of forward map bit lines running parallel to said p-th row and said q-th column.

10. An instruction parallel issue and execution administrating device as claimed in claim 9, wherein said forward map buffer further comprises for storing said q-th column p-th row forward one-bit datum in said q-th column p-th row memory cell:

first means responsive to said q-th instruction requesting said q-th operand for supplying a q-th write enable signal to the word lines of said q-th column; and second means responsive to said p-th instruction producing said p-th result for supplying a p-th one-bit signal to the bit lines of said p-th row; and for reading said q-th column p-th row forward one-bit datum from said q-th column p-th row memory cell, third means responsive to a read request for supplying a p-th read enable signal to the word lines of said p-th row to make said q-th column p-th row memory cell produce said q-th column p-th row forward one-bit datum to the bit lines of said q-th column.

11. The superscalar processor as claimed in claim 1, further comprising:

a plurality of registers in which each of said instructions stores said respective execution result; and a register map buffer storing a register map indicating:
each of the instructions as a specified instruction, and
a specified one of said plurality of registers for storing said respective execution result of said specified instruction as a stored datum.

12. An instruction parallel issue and execution administrating device for use in a superscalar processor in issuing and executing a predetermined peak number of instructions in parallel, comprising:

a forward map buffer for storing a forward map indicating the use of results of the complete execution of each of said instructions as operands by the others of the instructions, the forward map being stored before actual production of the results and being used in identifying, when said execution of each of the instructions is complete, corresponding ones of the other instructions using as a respective operand the result indicated by said forward map;

a plurality of registers in which each of said instructions stores its result of execution; and a register map buffer for storing a register map indicative of said each of the instructions as a specified instruction and of a specified register in which said specified instruction should store among said plurality of registers said specified result as a stored datum;

said forward map buffer being for first to P-th and first to Q-th forward one-bit data, where P and Q represent a first and a second predetermined integer, each integer being not less than said predetermined peak number, said plurality of registers being first to R-th registers, where R represents a third predetermined integer dependent on none of said first and said second predetermined integers, wherein said register map is composed of a plurality of register one-bit data which are arranged in a two-dimensional matrix of first to R-th columns and first to P-th rows and in which an r-th column p-th row register one-bit datum is set at a first and a second specific value to indicate that a p-th result should and should not be stored as said stored datum in an r-th register, respectively, where p represents one of 1 to P, r representing one of 1 to R.

13. An instruction parallel issue and execution administrating device as claimed in claim 12, wherein said first specific value is given in said register map to said r-th column p-th row register one-bit datum before said actual production of said p-th result by said complete execution of said specified instruction when said p-th result should be stored as said stored datum in said r-th register.

14. An instruction parallel issue and execution administrating device as claimed in claim 13, said superscalar processor further comprising an instruction fetching unit for fetching and supplying said predetermined peak number of instructions in successive periods as first to S-th instructions to said forward and said register map buffers with a prescribed peak number of the instructions fetched in parallel concurrently in each of said successive periods and with fetch and supply of said first to said S-th instructions suspended when S increases to P, where S represents a fourth predetermined integer, wherein:

said r-th column p-th row register one-bit datum is read from said register map on specifying, before a p-th instruction is issued among said first to said S-th instructions as said specified instruction to request an r-th datum stored in said r-th register as a p-th operand, said r-th register as said specified register in response to said p-th instruction; and on specifying one of said first to said R-th registers in which a result of a latest fetched instruction among said first to said S-th instructions should be stored, said first specific value is given to each of the register one-bit data of one of said first to said P-th rows that is assigned to said latest fetched instruction, said second specific value being given to each of others of said plurality of register one-bit data that is other than the register one-bit data of said one of the first to the P-th rows.

15. An instruction parallel issue and execution administrating device as claimed in claim 12, said superscalar processor further comprising an instruction fetching unit for fetching and supplying said predetermined peak number of instructions in successive periods as first to S-th instructions to said forward and said register map buffers with a prescribed peak number of the instructions fetched in parallel concurrently in each of said successive periods and with fetch and supply of said first to said S-th instructions suspended when S increases to P, where S represents a fourth predetermined integer, wherein:

said r-th column p-th row register one-bit datum is read from said register map on specifying, before a p-th instruction is issued among said first to said S-th instructions as said specified instruction to request an r-th datum stored in said r-th register as a p-th operand, said r-th register as said specified register in response to said p-th instruction; and on specifying one of said first to said R-th registers in which a result of a latest fetched instruction among said first to said S-th instructions should be stored, said first specific value is given to each of the register one-bit data of one of said first to said P-th rows that is assigned to said latest fetched instruction, said second specific value being given to each of others of said plurality of register one-bit data that is other than the register one-bit data of said one of the first to the P-th rows.

16. An instruction parallel issue and execution administrating device as claimed in claim 12, wherein said register map buffer comprises a plurality of register bit cells arranged as an orthogonal memory in said two-dimensional matrix with an r-th column p-th row register bit cell used for storage and read-out of said r-th column p-th row register one-bit datum and connected to a plurality of register map word lines running parallel to said r-th column and said p-th row and to a plurality of register map bit lines running parallel to said p-th row and said r-th column.

17. An instruction parallel issue and execution administrating device as claimed in claim 16, wherein said register map buffer further comprises:

for storing said r-th column p-th row register one-bit datum in said r-th column p-th row register bit cell, storing means responsive to said p-th instruction specifying said r-th register for storage of said p-th result for supplying a p-th write enable signal to the word lines of said p-th row and an r-th one-bit signal to the bit lines of said r-th column; and for reading said r-th column p-th row register one-bit datum from said r-th column p-th row register bit cell, reading means responsive to said r-th register indicated by said p-th instruction to produce its operand for supplying an r-th read enable signal to the word lines of said r-th column to make said r-th column p-th row register bit cell produce said r-th column p-th row register one-bit datum to the bit lines of said p-th row.

18. An instruction parallel issue and execution administrating device as claimed in claim 16, wherein:

said register map buffer produces the register one-bit data of said r-th column as produced data, with each of said produced data given said first specific value, when a plurality of succeeding instructions fetched not earlier than a preceding instruction among said first to said S-th instructions request as each of their operands the stored datum of said r-th register;

said instruction parallel issue and execution administrating device still further comprising a write-in detector responsive to said preceding instruction for selecting one of said succeeding instructions as a latest fetched instruction that is latest fetched among said succeeding instructions, said write-in detector being furthermore for making said latest fetched instruction indicate said first specific value and each of others of said succeeding instructions indicate said second specific value;

said forward map buffer further comprising renewing means responsive to a q-th instruction serving as said preceding instruction and to a p-th instruction serving as said latest fetched instruction for supplying a q-th write enable signal to the word lines of said q-th column and said first and said second predetermined values to the bit lines of said p-th row and of others of said first to said P-th rows other than said p-th row, respectively, to renew said q-th column p-th row forward one-bit datum to said first predetermined value and each of others of the forward one-bit data of said q-th column other than said q-th column p-th row forward one-bit datum to said second predetermined value.

19. An instruction parallel issue and execution administrating device as claimed in claim 16, wherein:

said register map buffer produces the register one-bit data of said r-th column as produced data, with each of said produced data given said first specific value, when a plurality of succeeding instructions fetched not earlier than a preceding instruction among said first to said S-th instructions request as each of their operands the stored datum of said r-th register;

said instruction parallel issue and execution administrating device still further comprising a write-in detector responsive to said preceding instruction for selecting one of said succeeding instructions as a latest fetched instruction that is latest fetched among said succeeding instructions, said write-in detector being furthermore for making said latest fetched instruction indicate said first specific value and each of others of said succeeding instructions indicate said second specific value;

said forward map buffer further comprising renewing means responsive to a q-th instruction serving as said preceding instruction and to a p-th instruction serving as said latest fetched instruction for supplying a q-th write enable signal to the word lines of each of said first to said P-th rows to renew each of the forward one-bit data of said q-th column to said first predetermined value.

\* \* \* \* \*